United States Patent
Park et al.

(10) Patent No.: US 10,830,985 B2
(45) Date of Patent: Nov. 10, 2020

(54) LENS DRIVING APPARATUS

(71) Applicant: LG Innotek Co., Ltd., Seoul (KR)

(72) Inventors: Sang Ok Park, Seoul (KR); Hyune O Yoo, Seoul (KR); Seong Min Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 324 days.

(21) Appl. No.: 15/537,817

(22) PCT Filed: Dec. 3, 2015

(86) PCT No.: PCT/KR2015/013110
§ 371 (c)(1),
(2) Date: Jun. 19, 2017

(87) PCT Pub. No.: WO2016/099051
PCT Pub. Date: Jun. 23, 2016

(65) Prior Publication Data
US 2018/0011284 A1    Jan. 11, 2018

(30) Foreign Application Priority Data

Dec. 19, 2014  (KR) .......... 10-2014-0184639
Jan. 12, 2015  (KR) .......... 10-2015-0004070

(51) Int. Cl.
G02B 7/10     (2006.01)
H02K 33/18    (2006.01)
(Continued)

(52) U.S. Cl.
CPC ............. *G02B 7/102* (2013.01); *G02B 7/08* (2013.01); *G02B 7/09* (2013.01); *G03B 3/10* (2013.01);
(Continued)

(58) Field of Classification Search
CPC . G02B 7/08; G02B 7/09; G02B 7/102; G03B 2205/0015; G03B 2205/0069;
(Continued)

(56) References Cited

U.S. PATENT DOCUMENTS 10,338,404 B2 *  7/2019  Park
2012/0008220 A1 *  1/2012  Lee .................. G03B 3/10
                                                    359/822
(Continued)

FOREIGN PATENT DOCUMENTS

CN    101846785 A    9/2010
CN    102253262 A    11/2011
(Continued)

OTHER PUBLICATIONS

International Search Report in International Application No. PCT/KR2015/013110, filed Dec. 3, 2015.
(Continued)

*Primary Examiner* — Joseph P Martinez
*Assistant Examiner* — Vipin Patel
(74) *Attorney, Agent, or Firm* — Saliwanchik, Lloyd & Eisenschenk

(57) ABSTRACT

One embodiment of a lens driving apparatus may comprise: a bobbin having a first coil disposed on the outer circumferential surface thereof; a position detection sensor which is disposed on the outer circumferential surface of the bobbin and which moves together with the bobbin; a first magnet disposed opposite to the first coil; a housing for supporting the first magnet; upper and lower elastic members which are coupled to the bobbin and the housing; and a plurality of wirings which are disposed on the outer circumferential surface of the bobbin so as to electrically connect at least one of the upper or lower elastic members with the position detection sensor.

17 Claims, 22 Drawing Sheets

(51) Int. Cl.
  *G03B 3/10* (2006.01)
  *G02B 7/08* (2006.01)
  *G03B 5/02* (2006.01)
  *G02B 7/09* (2006.01)
  *H02K 11/215* (2016.01)
  *H02K 41/035* (2006.01)

(52) U.S. Cl.
  CPC ............ *G03B 5/02* (2013.01); *H02K 11/215* (2016.01); *H02K 33/18* (2013.01); *H02K 41/0356* (2013.01); *G03B 2205/0015* (2013.01); *G03B 2205/0069* (2013.01)

(58) Field of Classification Search
  CPC .......... G03B 3/10; G03B 5/02; H02K 11/215; H02K 33/18; H02K 41/0356
  See application file for complete search history.

(56) References Cited

U.S. PATENT DOCUMENTS

| | | | | |
|---|---|---|---|---|
| 2013/0136438 | A1* | 5/2013 | Lee | .......................... G03B 3/10 396/133 |
| 2014/0355145 | A1 | 12/2014 | Park et al. | |
| 2016/0154249 | A1* | 6/2016 | Yeo | .......................... G03B 5/00 359/557 |

FOREIGN PATENT DOCUMENTS

| | | |
|---|---|---|
| CN | 102315748 A | 1/2012 |
| CN | 102332805 A | 1/2012 |
| CN | 103842905 A | 6/2014 |
| CN | 104238069 A | 12/2014 |
| CN | 204009314 U | 12/2014 |
| KR | 10-2010-0108259 A | 10/2010 |
| KR | 10-2012-0032287 A | 4/2012 |
| KR | 10-2012-0133904 A | 12/2012 |
| KR | 10-1220713 B1 | 1/2013 |
| KR | 10-2013-0060535 A | 6/2013 |
| KR | 10-1440807 B1 | 9/2014 |
| KR | 10-2014-0142685 A | 12/2014 |

OTHER PUBLICATIONS

Office Action dated May 29, 2019 in Chinese Application No. 201580069631.1.
Office Action dated Feb. 3, 2020 in Chinese Application No. 201580069631.1.

* cited by examiner

LENS DRIVING APPARATUS

CROSS-REFERENCE TO RELATED APPLICATIONS

This application is the U.S. national stage application of International Patent Application No. PCT/KR2015/013110, filed Dec. 3, 2015, which claims priority to Korean Application Nos. 10-2014-0184639, filed Dec. 19, 2014, and 10-2015-0004070, filed Jan. 12, 2015, the disclosures of each of which are incorporated herein by reference in their entirety.

TECHNICAL FIELD

Embodiments relate to a lens moving apparatus.

BACKGROUND ART

In this section, the following description merely provides information regarding the background of the embodiments, and does not constitute the conventional art.

In recent years, information technology (IT) products equipped with miniature digital cameras, such as mobile phones, smartphones, tablet PCs, and laptop computers, have been actively developed.

A lens moving apparatus that adjusts the distance between an image sensor, which converts external light into a digital image or a digital video, and a lens to control the focal distance of the lens, that is, performs auto focusing, is mounted in conventional IT products equipped with miniature digital cameras.

Auto focusing may be performed by measuring the displacement value in the optical-axis direction, i.e. the first direction, using an optical-axis displacement sensing means included in the lens moving apparatus and adjusting the distance between the image sensor and the lens using a control means based on the measured displacement value.

Meanwhile, in the case in which the lens moving apparatus includes an auto focusing means, the lens moving apparatus may become complicated due to the auto focusing means, or interference between the auto focusing means and other elements of the lens moving apparatus may occur.

DISCLOSURE

Technical Problem

Embodiments provide a lens moving apparatus that is capable of performing stable and accurate auto focusing. In addition, embodiments provide a lens moving apparatus including an auto focusing means having a structure that is simple and is capable of considerably reducing interference with other elements.

It should be noted that the objects of the disclosure are not limited to the objects mentioned above, and other unmentioned objects of the disclosure will be clearly understood by those skilled in the art to which the disclosure pertains from the following description.

Technical Solution

In one embodiment, a lens moving apparatus includes a bobbin having a first coil disposed on the outer circumferential surface thereof, a position sensor disposed on the outer circumferential surface of the bobbin, the position sensor being configured to move together with the bobbin, a first magnet disposed so as to be opposite the first coil, a housing configured to support the first magnet, upper and lower elastic members coupled to the bobbin and the housing, and a plurality of wires disposed on the outer circumferential surface of the bobbin for connecting at least one of the upper and lower elastic members to the position sensor.

In another embodiment, a lens moving apparatus includes a bobbin, a position sensor disposed on the outer circumferential surface of the bobbin, the position sensor being configured to move together with the bobbin, a plurality of wires disposed on the outer circumferential surface of the bobbin so as to be connected to the position sensor, a first coil disposed on the outer circumferential surface of the bobbin, on which the position sensor is disposed, a first magnet disposed so as to be opposite the first coil, a housing configured to support the first magnet, upper and lower elastic members coupled to the bobbin and the housing, and a printed circuit board connected to at least one of the upper and lower elastic members, wherein at least one of the upper and lower elastic members is divided into two or more parts, and the wires connect at least one of the divided upper and lower elastic members to the position sensor.

In a further embodiment, a lens moving apparatus includes a bobbin having a first coil installed at the outer circumferential surface thereof, a position sensor provided at the bobbin, a first magnet provided so as to be opposite the first coil and the position sensor, a housing configured to support the first magnet, and a conductive pattern formed on the bobbin by plating, the conductive pattern being connected to the position sensor.

Advantageous Effects

In embodiments, it is possible to perform stable and accurate auto focusing.

In addition, a position sensor provided at a bobbin is connected to an upper elastic member using a conductive pattern formed on the surface of the bobbin, whereby it is possible to simplify the structure of a lens moving apparatus.

In addition, since the conductive pattern formed on the surface of the bobbin is used, it is possible to more considerably reduce interference between elements constituting the lens moving apparatus than in the case in which an additional structure for connection or an electrical conduction member is used.

BEST MODE

Figure 1:
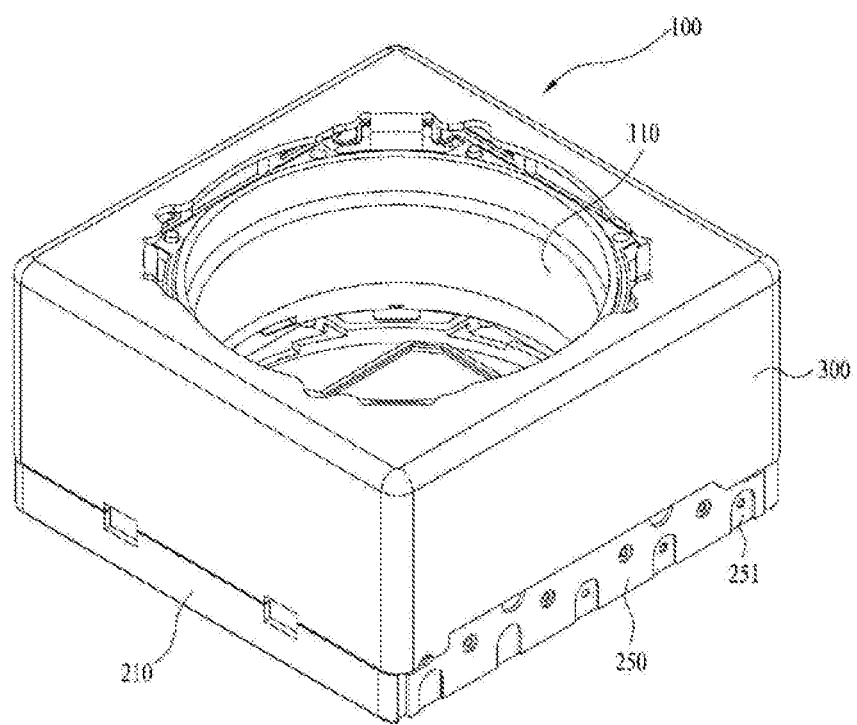
FIG. 1 is a schematic perspective view of a lens moving apparatus according to an embodiment.

Reference will now be made in detail to embodiments, examples of which are illustrated in the accompanying drawings. In the following description of the embodiments, it will be understood that, when a layer (film), region, pattern, or structure is referred to as being "on" or "under" another layer (film), region, pattern, or structure, it can be "directly" on or under the other layer (film), region, pattern, or structure or can be "indirectly" formed such that an intervening element is also present. In addition, terms such as "on" or "under" should be understood on the basis of the drawings.

In the drawings, the sizes of respective elements are exaggerated, omitted, or schematically illustrated for convenience and clarity of description. Further, the sizes of the respective elements do not denote the actual sizes thereof. In addition, wherever possible, the same reference numbers will be used throughout the drawings to refer to the same or like parts.

Hereinafter, a lens moving apparatus according to an embodiment will be described with reference to the accompanying drawings. For the convenience of description, the lens moving apparatus according to the embodiment will be described using a Cartesian coordinate system (x, y, z). However, the disclosure is not limited thereto. Other different coordinate systems may be used. In the drawings, an x axis and a y axis are directions perpendicular to a z axis, which is an optical-axis direction. The z-axis direction, which is the optical-axis direction, may be referred to as a 'first direction', the x-axis direction may be referred to as a 'second direction', and the y-axis direction may be referred to as a 'third direction'.

Figure 2:
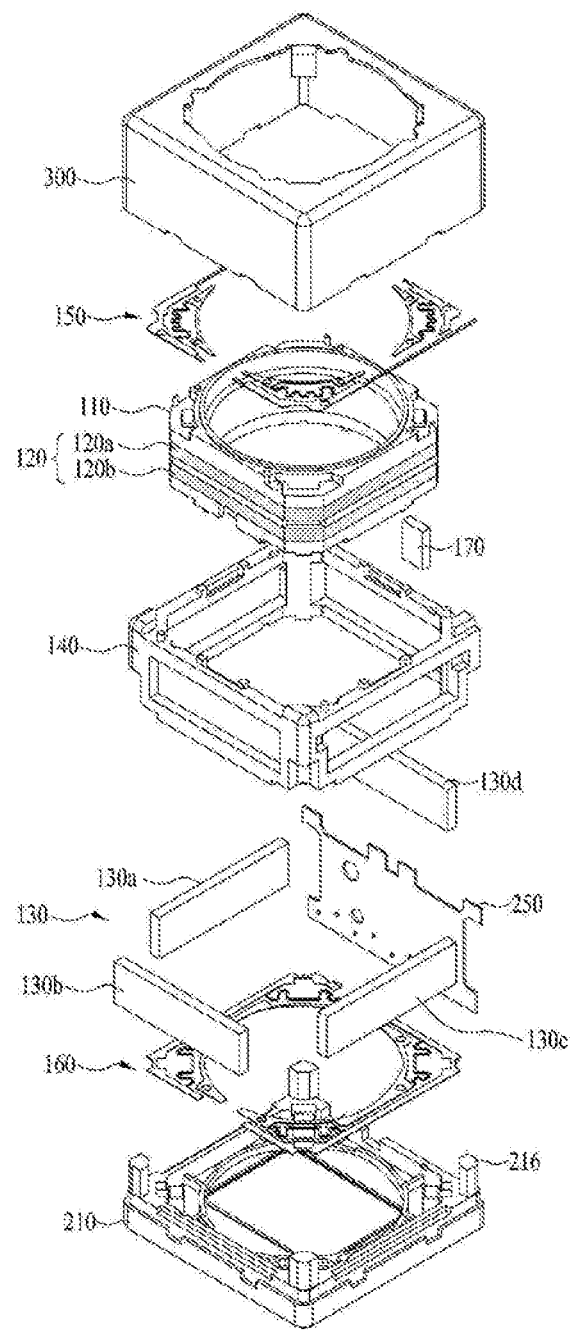
FIG. 2 is an exploded perspective view of the lens moving apparatus shown in FIG. 1.

FIG. 1 is a schematic perspective view of a lens moving apparatus 100 according to an embodiment, and FIG. 2 is an exploded perspective view of the lens moving apparatus 100 shown in FIG. 1.

Referring to FIGS. 1 and 2, the lens moving apparatus 100 includes a cover member 300, a bobbin 110, at least one position sensor pad P1 to P4, a plurality of wires 501 to 504, a first coil 120, a first magnet 130, a housing 140, an upper elastic member 150, a lower elastic member 160, a position sensor 170, a base 210, and a printed circuit board 250.

The bobbin 110, the first coil 120, the first magnet 130, the housing 140, the upper elastic member 150, the lower elastic member 160, and the position sensor 170 may constitute a moving unit. The moving unit may perform an auto focusing function. The 'auto focusing function' means a function of automatically focusing an image of a subject on the surface of an image sensor.

First, the cover member 300 will be described.

The cover member 300 receives the upper elastic member 150, the bobbin 110, the first coil 120, the housing 140, the position sensor 170, the first magnet 130, the lower elastic member 160, and the printed circuit board 250 in a receiving space defined by the cover member 300 and the base 210.

The cover member 300 may be formed in the shape of a box, the lower portion of which is open and which includes an upper end and sidewalls. The lower portion of the cover member 300 may be coupled to the upper portion of the base 210. The upper end of the cover member 300 may be formed in a polygonal shape, such as a quadrangular or octagonal shape.

The cover member 300 may be provided in the upper end thereof with a hollow, through which a lens (not shown) coupled to the bobbin 110 is exposed to external light. In addition, a window, made of a light-transmissive material, may be further provided in the hollow of the cover member 300 in order to prevent foreign matter, such as dust or moisture, from permeating into a camera module.

The cover member 300 may be made of a non-magnetic body, such as SUS, in order to prevent the cover member from being attached to the first magnet 130. Alternatively, the cover member 300 may be made of a magnetic body so as to perform a yoke function.

Next, the bobbin 110 will be described.

Figure 3:
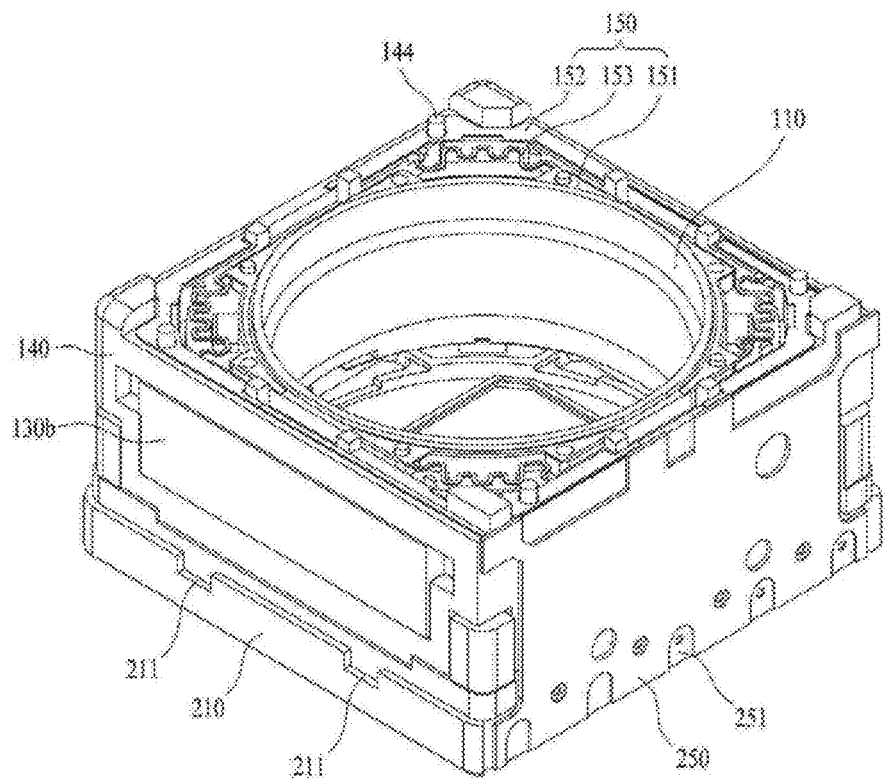
FIG. 3 is an assembled perspective view of the lens moving apparatus shown in FIG. 1, from which a cover member is removed.
Figure 4:
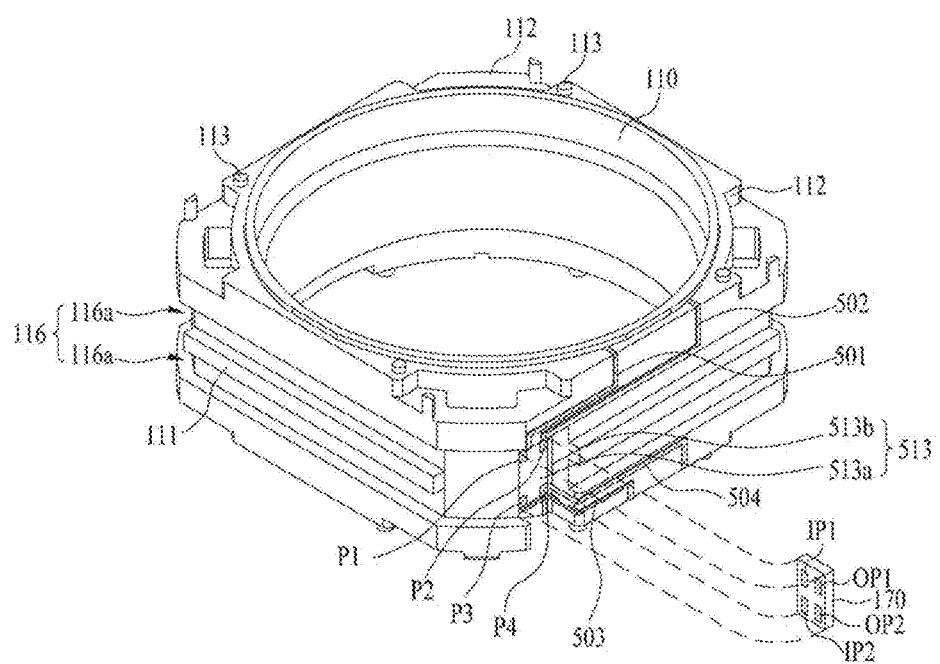
FIG. 4 is a perspective view showing a bobbin of FIG. 1.
Figure 5:
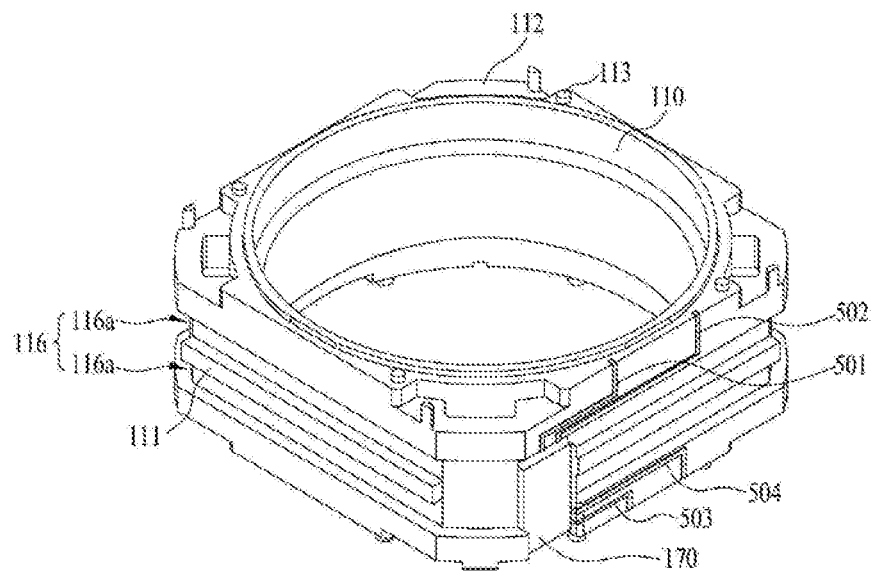
FIG. 5 is a view of a position sensor mounted to the bobbin shown in FIG. 4.
Figure 6A:
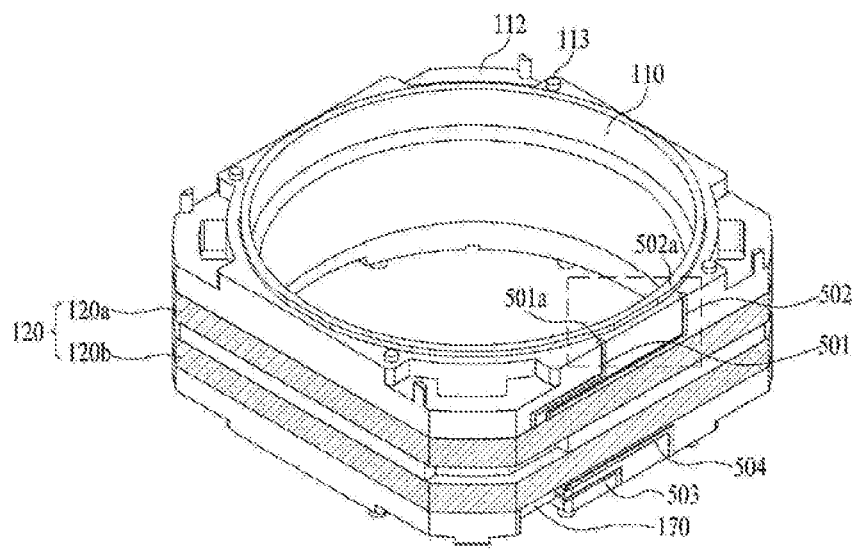
FIG. 6A is an upper perspective view of the bobbin, to which a first coil is mounted.
Figure 6B:
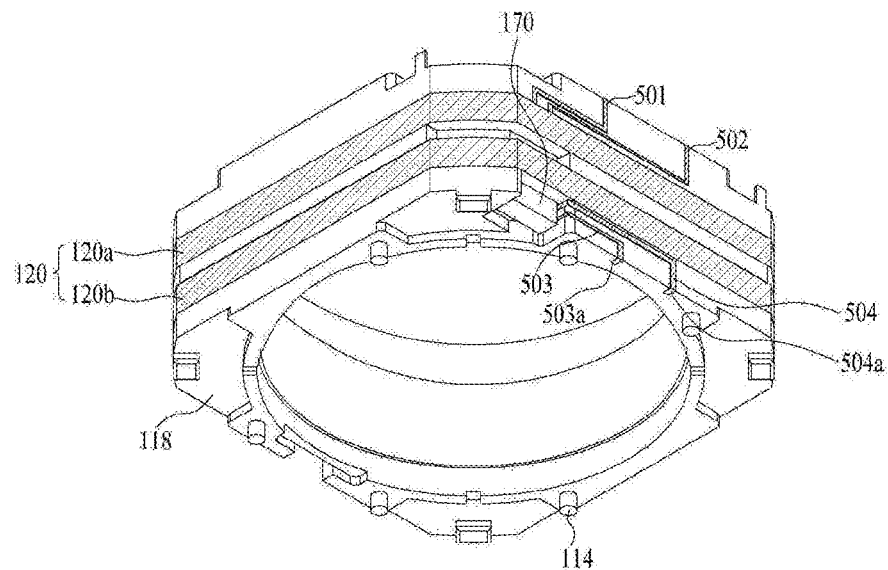
FIG. 6B is a lower perspective view of the bobbin, to which the first coil is mounted.

FIG. 3 is an assembled perspective view of the lens moving apparatus 100 shown in FIG. 1, from which the cover member 300 is removed, FIG. 4 is a perspective view showing the bobbin 110 of FIG. 1, FIG. 5 is a view of the position sensor 170 mounted to the bobbin 110 shown in FIG. 4, FIG. 6A is an upper perspective view of the bobbin 110, to which the first coil 120 is mounted, and FIG. 6B is a lower perspective view of the bobbin 110, to which the first coil 120 is mounted.

Referring to FIGS. 3 to 6B, the bobbin 110 is disposed inside the housing 140. The bobbin 110 may move in the optical-axis direction or in the first direction parallel to the optical-axis direction (e.g. the X-axis direction) as the result of electromagnetic interaction between the first coil 120 and the first magnet 130.

Although not shown, the bobbin 110 may include a lens barrel (not shown), in which at least one lens is installed. The lens barrel may be coupled to the inside of the bobbin 110 in various manners.

The bobbin 110 may have a hollow, in which the lens or the lens barrel is mounted. The shape of the hollow of the bobbin 110 may conform to that of the lens or the lens barrel. For example, the hollow may be formed in a circular, oval, or polygonal shape. However, the disclosure is not limited thereto.

The bobbin 110 may have at least one upper supporting protrusion 113 disposed on the upper surface thereof and at least one lower supporting protrusion 114 disposed on the lower surface thereof.

The upper supporting protrusion 113 and the lower supporting protrusion 114 may each be formed in a cylindrical shape or a prism shape. However, the disclosure is not limited thereto.

The upper supporting protrusion 113 of the bobbin 110 may be coupled and fixed to an inner frame 151 of the upper elastic member 150, and the lower supporting protrusion 114 of the bobbin 110 may be coupled and fixed to an inner frame 161 of the lower elastic member 160.

The bobbin 110 may have an upper escape recess 112 provided in one region of the upper surface thereof corresponding to a connection portion 153 of the upper elastic member 150. In addition, the bobbin 110 may have a lower escape recess 118 provided in one region of the lower surface thereof corresponding to a connection portion 163 of the lower elastic member 150.

When the bobbin 110 moves in the first direction, spatial interference between the connection portions 153 and 163 of the upper and lower elastic members 150 and 160 and the bobbin 110 may be eliminated due to the upper escape recess 112 and the lower escape recess 118 of the bobbin 110, with the result that the connection portions 153 and 163 of the upper and lower elastic members 150 and 160 may be more easily elastically deformed.

The upper and lower escape recesses 112 and 118 of the bobbin 110 may be disposed adjacent to the corners of the bobbin 110. However, the disclosure is not limited thereto. The upper and lower escape recesses may be disposed at the lateral surfaces of the bobbin 110 located between the corners of the bobbin 110 depending on the shape and/or position of the connection portions 153 and 163 of the upper and lower elastic members 150 and 160.

The bobbin 110 may be provided in the outer circumferential surface thereof with at least one coil location recess 116, in which the first coil 120 is disposed or installed. The shape and number of coil location recesses 116 may correspond to the shape and number of first coils disposed on the outer circumferential surface of the bobbin 110.

For example, the location recess 116 of the bobbin 110 according to the embodiment may include a first location recess 116a and a second location recess 116b, which is disposed under the first location recess 116a. Between the first location recess 116a and the second location recess 116b may be disposed a protrusion 111 for separating the first location recess 116a and the second location recess 116b from each other. In another embodiment, the bobbin 110 may have no coil location recess, and the first coil 120 may be directly wound around and fixed to the outer circumferential surface of the bobbin 110.

The protrusion 111 of the bobbin 110 may stably fix or support the first coil 120 wound around the outer circumferential surface of the bobbin 110.

The protrusion 111 of the bobbin 110 may extend in the direction in which the protrusion of the bobbin rotates about the optical axis, and may have a predetermined width in the first direction. The protrusion 111 of the bobbin 110 may not be formed in the region of the outer circumferential surface of the bobbin 110 in which a position sensor receiving recess 513 (see FIG. 4) is provided.

The protrusion 111 of the bobbin 110 may be formed in the shape of a ring, which is integrally formed with the outer circumferential surface of the bobbin 110. However, the disclosure is not limited thereto. In another embodiment, the protrusion 111 of the bobbin 110 may include a plurality of divided portions, which may be spaced apart from each other. However, the disclosure is not limited thereto.

The bobbin 110 may be provided in the outer circumferential surface thereof with a position sensor receiving recess 513, in which the position sensor 170 is disposed.

The position sensor receiving recess 513 may be recessed from the outer circumferential surface of the bobbin 110 by a predetermined depth.

At least a portion of the position sensor receiving recess 513 may be recessed further inward from the bobbin 110 by a predetermined depth than the location recess 116 of the bobbin 110 in order to prevent interference between the position sensor 170, which is mounted in the position sensor receiving recess 513, and the first coil 120, which is mounted in the location recess 116 in the bobbin 110.

For example, the depth of the position sensor receiving recess 513 may be greater than or equal to at least the height of the position sensor 170 such that the position sensor 170, which is received in the position sensor receiving recess 513, does not protrude from the uppermost end of the location recess 116 in the bobbin 110.

When the lens moving apparatus 100 further includes a position sensor magnet (not shown) in addition to the first magnet 130, the position sensor receiving recess 513 may be disposed so as to correspond to or to be aligned with the position of the housing 140 at which the position sensor magnet (not shown) is mounted.

Referring to FIG. 4, the position sensor receiving recess 513 may include a bottom 513a and a sidewall 513b.

The sidewall 513b of the position sensor receiving recess 513 may have therein an opening that communicates with one of the lower surface and the upper surface of the bobbin 110. In FIG. 4, the sidewall 513b of the position sensor receiving recess 513 has therein an opening 119 that communicates with the lower surface of the bobbin 110. However, the disclosure is not limited thereto. In another embodiment, the position sensor receiving recess 513 may be a recess having no opening. The opening 119 in the position sensor receiving recess 513 may serve as an entrance, through which the position sensor 170 is easily inserted into the position sensor receiving recess 513.

An adhesive may be disposed between the position sensor receiving recess 513 and the position sensor 170. The position sensor 170 may be fixed to the position sensor receiving recess 513 via the adhesive.

The at least one position sensor pad P1 to P4 is provided at at least one of the bottom 513a and the sidewall 513b of the position sensor receiving recess 513.

For example, the position sensor pads P1 to P4 may be disposed on the bottom 513a of the position sensor receiving recess 513 so as to be spaced apart from one another. FIG. 4 shows four position sensor pads P1 to P4. However, the disclosure is not limited thereto. In the case in which the position sensor 170 is a structure including a Hall sensor and a driver, a total of six position sensor pads P1 to P4 may be disposed so as to be spaced apart from each other.

In FIG. 4, each of the position sensor pads P1 to P4 is disposed at one region of the bottom 513a of the position sensor receiving recess 513 that is adjacent to a corresponding one of the corners thereof. However, the disclosure is not limited thereto. In another embodiment, the position sensor pads may be disposed at one side of the bottom between adjacent corners so as to be adjacent to each other, and each of the position sensor pads may correspond to or may be aligned with a corresponding one of first and second input pads IP1 and IP2 and first and second output pads OP1 and OP2 of the position sensor 170.

The position sensor pads P1 to P4 may be connected to the position sensor 170 via the wires 501 to 504.

FIG. 4 shows four position sensor pads P1 to P4 for (+) input, (−) input, (+) output, and (−) output of the position sensor 170. However, the disclosure is not limited thereto. Each of the (+) input and the (−) input of the position sensor 170 may be input through a corresponding one of the first and second input pads IP1 and IP2 of the position sensor 170, and each of the (+) output and the (−) output of the position sensor 170 may be output through a corresponding one of the first and second output pads OP1 and OP2.

Each of the wires 501 to 504 is disposed on the outer circumferential surface of the bobbin 110, and is connected to a corresponding one of the position sensor pads P1 to P4.

For example, the wires 501 to 504 may be provided on the lateral surface of the bobbin 110 that is opposite or adjacent to the printed circuit board 250. However, the disclosure is not limited thereto. In another embodiment, the wires may be provided on the surface that is opposite the lateral surface that is opposite or adjacent to the printed circuit board 250.

For example, one end of each of the wires 501 to 504 may be bonded to a corresponding one of the position sensor pads P1 to P4.

The bobbin 110 may be provided in the outer circumferential surface thereof with line grooves (e.g. L1 and L2), in which the wires 501 to 504 are disposed, the line grooves being spaced apart from each other. For example, one end of each of the first and second line grooves L1 and L2 may contact the upper sidewall of the position sensor receiving recess 513, and the other end of each of the first and second line grooves L1 and L2 may contact the upper surface of the bobbin 110 or may extend to the upper surface of the bobbin 110.

In addition, for example, one end of each of the third and fourth line grooves may contact the lower sidewall of the position sensor receiving recess 513, and the other end of each of the third and fourth line grooves may contact the lower surface of the bobbin 110, or may extend to the lower surface of the bobbin 110.

Each of the wires 501 to 504 may be disposed in a corresponding one of the line grooves. For example, the wires 501 to 504 may be conductive materials that fill the line grooves, and the depth of the line grooves may be greater than or equal to at least the thickness of the wires 501 to 504 such that the wires 501 to 504 received in the line grooves do not protrude from the outer circumferential surface of the bobbin 110. In order to prevent contact therebetween, the wires 501 to 504 and the first coil 120, which are disposed on the outer circumferential surface of the bobbin 110, may be spaced apart from each other.

For connection with the upper or lower elastic member 150 and 160, the other end of each of the wires 501 to 504 may extend to the upper surface or the lower surface of the bobbin 110.

Referring to FIG. 6A, the other end of each of the first and second wires 501 and 502 may be disposed on the upper surface of the bobbin 110 so as to be spaced apart from each other. For example, the other end of each of the first and second wires 501 and 502 may extend to the upper surface of the bobbin 110.

In addition, referring to FIG. 6B, the other end of each of the third and fourth wires 503 and 504 may be disposed on the lower surface of the bobbin 110 so as to be spaced apart from each other. For example, the other end of each of the third and fourth wires 503 and 504 may extend to the lower surface of the bobbin 110.

Figure 7A:
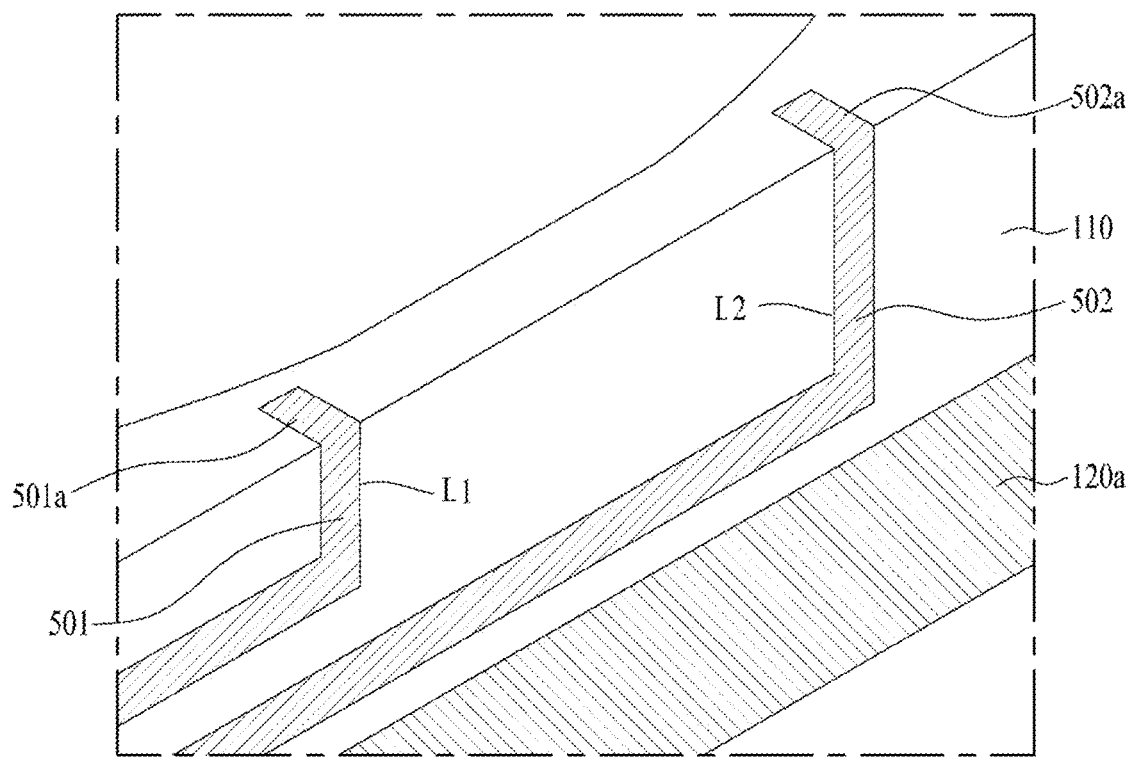
FIG. 7A is an enlarged view of a dotted portion shown in FIG. 6A according to an embodiment.

FIG. 7A is an enlarged view of a dotted portion shown in FIG. 6A according to an embodiment.

Referring to FIG. 7A, the widths of the first and second wires 501 and 502, which are located on the outer surface and the upper surface of the bobbin 110, may be the same. In the same manner, the widths of the third and fourth wires 503 and 504, which are located on the outer surface and the upper surface of the bobbin 110, may be the same.

Ends 501a and 502a of the first and second wires 501 and 502 may be connected to one end of the inner frame 151 of the upper elastic member 150, and ends 503a and 504a of the third and fourth wires 503 and 504 may be connected to one end of the inner frame 161 of the lower elastic member 160.

Figure 7B:
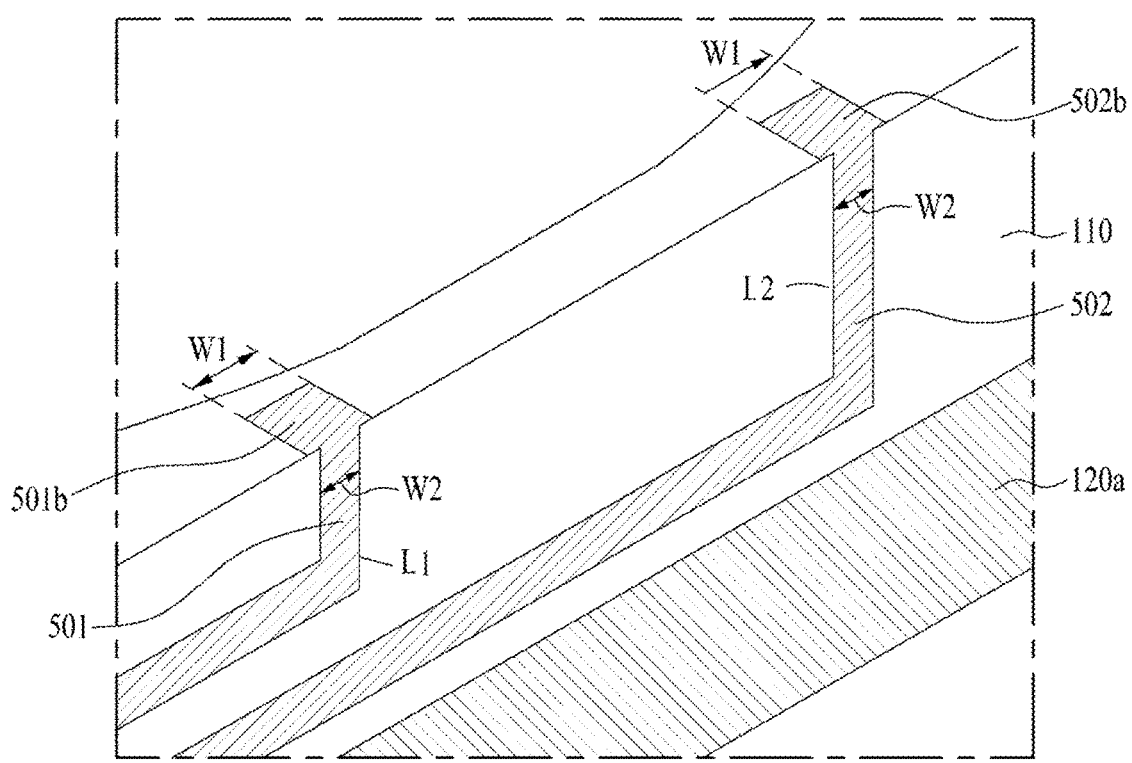
FIG. 7B is an enlarged view of the dotted portion shown in FIG. 6A according to another embodiment.

FIG. 7B is an enlarged view of the dotted portion shown in FIG. 6A according to another embodiment.

Referring to FIG. 7B, connection pads 501b and 502b may be provided at the other ends of the first and second wires 501 and 502.

For example, a first connection pad 501b, to which one end of the inner frame 151 of the divided first upper elastic member 150a is connected, may be provided at the other end of the first wire 501, and a second connection pad 502b, to which one end of the inner frame 151 of the divided second upper elastic member 150b is connected, may be provided at the other end of the second wire 502.

The width W1 of each of the first and second connection pads 501b and 502b of the first and second wires 501 and 502 may be greater than the width W2 of the remaining portions of the first and second wires 501 and 502.

In addition, connection pads may be provided at the other ends of the third and fourth wires 503 and 504.

For example, a third connection pad, to which one end of the inner frame 161 of the divided first lower elastic member 160a is connected, may be provided at the other end of the third wire 503, and a fourth connection pad, to which one end of the inner frame 161 of the divided second lower elastic member 160b is connected, may be provided at the other end of the fourth wire 504.

The width of each of the third and fourth connection pads of the third and fourth wires 503 and 504 may be greater than the width W2 of the remaining portions of the third and fourth wires 503 and 504.

As the width W1 of the first to fourth connection pads of the first to fourth wires 501 to 504 is increased, the first to fourth connection pads may be easily connected or bonded to corresponding ends of the inner frames 151 and 161 of the upper and lower elastic members 150 and 160. In addition, as the contact area between the first to fourth wires 501 to 504 and the upper and lower elastic members 150 and 160 is increased, contact resistance therebetween may be reduced.

In another embodiment, the wires 501 to 504 may be covered or sealed with an insulation material, an insulation layer, or an insulation film in order to prevent the connection with the first coil 120.

Next, the position sensor 170 will be described.

The position sensor 170 may be disposed at, coupled to, or mounted on the bobbin 110 so as to be movable together with the bobbin 110.

When the bobbin 110 moves in the first direction, which is parallel to the optical axis, the position sensor 170 may move together with the bobbin 110. In addition, the position sensor 170 may sense the intensity of a magnetic field emitted by the first magnet 130 in response to the movement of the bobbin 110, and may output a feedback signal based on the sensed result. The displacement of the bobbin 110 in the first direction may be adjusted based on the feedback signal.

As previously described, the position sensor 170 may be connected to the position sensor pads P1 to P4. The position sensor 170 may be constituted by a Hall sensor alone or by a driver including a Hall sensor, which, however, is illustrative. Any sensor capable of sensing a position, in addition to the magnetic field, may be used. For example, the position sensor may be constituted by a photoreflector.

For example, in the case in which the position sensor 170 is constituted by a Hall sensor alone, the position sensor 170 may need four terminals or pads (e.g. IP1, IP2, OP1, and OP2; see FIG. 4) for (+) input, (−) input, (+) output, and (−) output.

FIGS. 4 and 5 show an example in which the position sensor 170 is constituted by a Hall sensor alone. However, the disclosure is not limited thereto.

In another embodiment in which the position sensor 170 is constituted by a Hall sensor and a driver for I2C communication, the position sensor 170 may receive data from the Hall sensor, and may perform data communication, e.g. I2C communication, with an external controller using some protocol. In addition, in the case in which the position sensor 170 is constituted by a Hall sensor and a driver for I2C communication, the position sensor 170 may require a total of six terminals or pads. The terminals required by the position sensor 170 may be four terminals assigned to a first power VCC, a second power GND, a synchronization clock signal SCL, and data bit information SDA, and two terminals assigned to two powers VCM+ and VCM− that are necessary to supply current to the first coil 120. In addition, the position sensor 170 may further include test terminals for testing.

The position sensor 170 may be disposed at, coupled to, or mounted on the bobbin 110 in various manners.

For example, the position sensor 170 may be disposed in the position sensor receiving recess 513, which is formed in the outer circumferential surface of the bobbin 110, and may be connected to the position sensor pads P1 to P4.

The position sensor 170 may be connected to at least one of the upper and lower elastic members 150 and 160 via the wires 501 to 504, which are connected to the position sensor pads P1 to P4. For example, the position sensor 170 may be connected to the divided first and second upper elastic members 150a and 150b and the divided first and second lower elastic members 160a and 160b via the wires 501 to 504, which are connected to the position sensor pads P1 to P4.

As the position sensor 170 moves in the first direction together with the bobbin 110, the position sensor 170 may sense the change of magnetic force emitted by the first magnet 130. Alternatively, in an embodiment in which an additional position sensor magnet is further provided in the housing 140, the position sensor 170 may be disposed opposite the position sensor magnet, and may sense the change of magnetic force emitted by the position sensor magnet.

In another embodiment, the position sensor 170 may be disposed inside the base 210 at the lateral surface thereof. In this case, the position sensor 170 may be coupled to the base 210, since the lower portion of the printed circuit board 250 is coupled to the base 210.

In this case, the position sensor magnet may be disposed at the bobbin 110, which is included in the moving unit so as to be movable in the first direction, since the position sensor 170 does not move in the first direction.

In addition, the base 210 may be provided with a hole or a recess, in which the position sensor 170 is located, such that the position sensor 170 is disposed inside the base 210 at the lateral surface thereof.

Next, the first coil 120 will be described.

The first coil 120 is disposed on the outer circumferential surface of the bobbin 110, to which the position sensor 170 is mounted, and electromagnetically interacts with the first magnet 130, which is disposed in the housing 140.

For example, the first coil 120 may be disposed on the outer circumferential surface of the bobbin 110, at which the position sensor 170 is disposed in the position sensor receiving recess 113.

The bobbin 110 may move in the first direction as the result of the electromagnetic interaction between the first coil 120 and the first magnet 120, and may be elastically supported by the upper and lower elastic members 150 and 160, thereby performing an auto focusing function.

As shown in FIGS. 6A and 6B, the first coil 120 may be wound around the outer circumferential surface of the bobbin 110 so as to rotate about the optical axis in the clockwise direction or in the counterclockwise direction.

In order to increase the magnitude of electromagnetic force between the first coil 120 and the first magnet 130, the first coil 120 may include two coil blocks 120a and 120b that rotate about the optical axis in the clockwise direction or in the counterclockwise direction. The effect of the electromagnetic force generated by the first coil 120 may be minimized by the first coil block 120a and the second coil block 120b, which are arranged in that order from top and bottom.

For example, the first coil block 120a and the second coil block 120b may be spaced apart from each other in the first direction, and the protrusion 111 of the bobbin 110 may be disposed between the first coil block 120a and the second coil block 120b. The first coil block 120a and the second coil block 120b may be spaced apart from each other by a predetermined distance by the protrusion 111 of the bobbin 110.

In another embodiment, the first coil 120 may be formed in the shape of a coil ring that is wound about an axis that is perpendicular to the optical axis in the clockwise direction or in the counterclockwise direction. The number of coil rings may be equal to the number of first magnets 130. However, the disclosure is not limited thereto.

The first coil 120 may be connected to at least one of the upper and lower elastic members 150 and 150.

Next, the housing 140 will be described.

The housing 140 supports the first magnet 130, and receives the bobbin 110 therein such that the bobbin 110 is movable in the first direction, which is parallel to the optical axis.

The housing 140 may be generally formed in a hollow column shape. For example, the housing 140 may have a polygonal (e.g. quadrangular or octagonal) or circular hollow therein.

Figure 8:
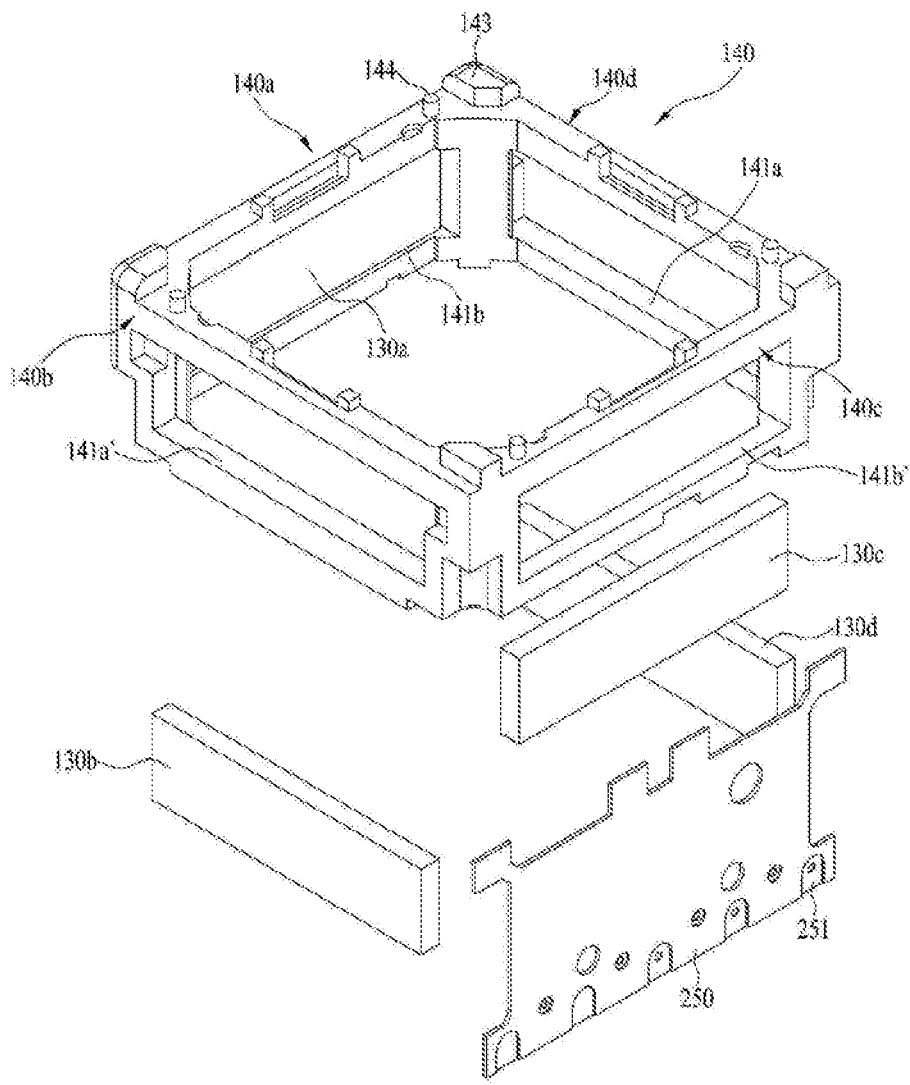
FIG. 8 is a schematic exploded perspective view showing a housing, a first magnet, and a printed circuit board.
Figure 9:
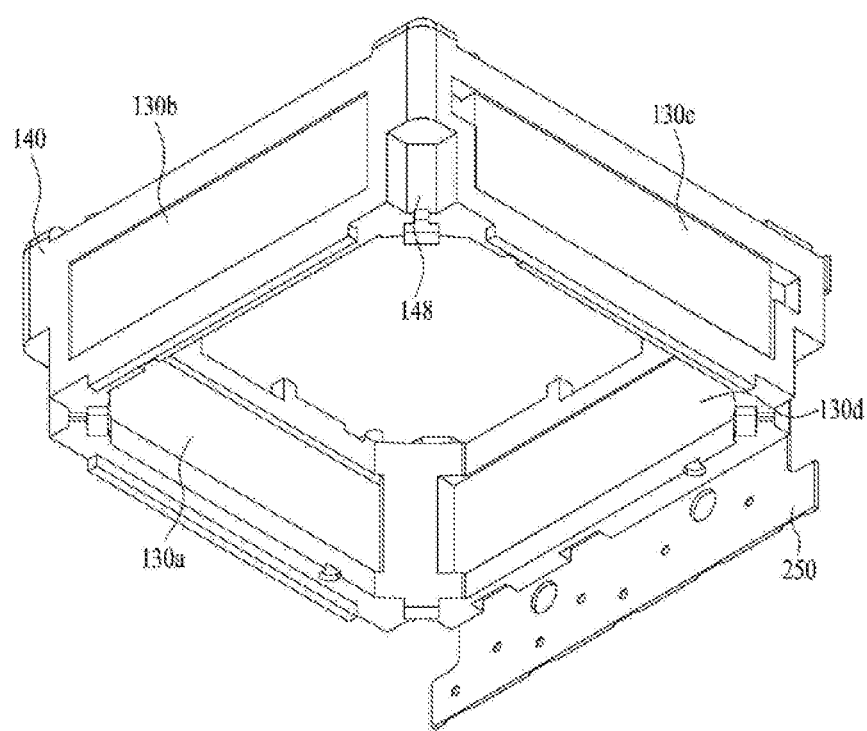
FIG. 9 is an assembled perspective view showing the housing, the first magnet, and the printed circuit board of FIG. 8.

FIG. 8 is a schematic exploded perspective view showing the housing 140, the first magnet 130, and the printed circuit board 250, and FIG. 9 is an assembled perspective view showing the housing 140, the first magnet 130, and the printed circuit board 250 of FIG. 8.

Referring to FIGS. 8 and 9, the housing 140 supports the first magnet 130 and the printed circuit board 250. In an embodiment in which a position sensor magnet is further provided, the housing 140 may support the position sensor magnet.

The housing 140 may include four edges 140a to 140d.

The first magnet 130 may be disposed at at least one of the four edges 140a to 140d. For example, at least one of the four edges 140a to 140d may be provided with a first magnet recess 141a, 141a', 141b, and 141b', in which the first magnet 130 is located, disposed, or fixed.

In an embodiment in which a position sensor magnet is further provided, at least one of the four edges 140a to 140d may be further provided with a recess, in which the position sensor magnet is inserted, disposed, fixed, or located.

In FIG. 8, each of the first magnet recesses 141a, 141a', 141b, and 141b' is formed in the shape of a through-hole. However, the disclosure is not limited thereto. each of the first magnet recess may be formed in the shape of a blind hole.

FIG. 8 shows four first magnet recesses 141a, 141a', 141b, and 141b', which correspond to four first magnets 130a to 130d. However, the number of first magnets 130 and first magnet recesses is not limited thereto.

The housing 140 may have a plurality of first stoppers 143 protruding from the upper surface thereof. The first stoppers 143 of the housing 140 are provided to prevent collisions between the cover member 300 and the housing 140. When an external impact is applied, the first stoppers may prevent direct collision between the upper surface of the housing 140 and the upper inner surface of the cover member 300.

In addition, the housing 140 may be provided on the upper surface thereof with a plurality of upper frame supporting protrusions 144, to which an outer frame 152 of the upper elastic member 150 is coupled.

In addition, the housing 140 may be provided on the lower surface thereof with a plurality of lower frame supporting protrusions 147, to which an outer frame 162 of the lower elastic member 160 is coupled.

In addition, the housing 140 may be provided in the corners thereof with lower guide recesses 148, into which guide members 216 of the base 210 are inserted, fastened, or coupled. When the housing 140 is located or disposed on the base 210, the coupling position of the housing 140 on the base 210 may be guided by the guide members 216 of the base 210 and the lower guide recesses 148. In addition, the housing may be prevented from deviating from the reference position thereof due to vibration during the operation of the lens moving apparatus 100 or due to a worker's error during the coupling of the lens moving apparatus.

Next, the first magnet 130 will be described.

The first magnet 130 is disposed at the housing 140 so as to correspond to the first coil 120.

For example, the first magnet 130 may be disposed in the first magnet recesses 141a, 141a', 141b, and 141b' in the housing 140 so as to overlap the first coil 120 in a direction that is perpendicular to the optical axis.

In another embodiment, no first magnet recesses may be formed in the edges 140a to 140d of the housing 140, and the first magnet 130 may be disposed outside or inside the edges 140a to 140d of the housing 140.

The first magnet 130 may have a shape corresponding to the edges 140a to 140d of the housing 140, such as a rectangular cube shape. However, the disclosure is not limited thereto.

The first magnet 130 may be configured as a single body, and may be a monopolar magnetized first magnet or a bipolar magnetized first magnet configured such that the surface of the first magnet that faces the first coil 120 has an S pole and the outer surface of the first magnet has an N pole. However, the disclosure is not limited thereto. The polarity of the first magnet may be reversed.

In the case in which the first magnet 130 is a bipolar magnetized first magnet, the first coil 120 may be wound in reverse directions so as to correspond to the respective poles of the first magnet. The first coil 120 may be inserted into the location recess 116 in the bobbin 110 in a wound state, or may be directly wound around the bobbin 110.

In addition, an additional location recess 116 for changing the winding direction may be provided in the bobbin 110, and the protrusion 111 of the bobbin 110 may be disposed between the coil blocks 120a and 120b.

The center of the position sensor 170 may be aligned with the center of the distance between the coil blocks 120a and 120b. For example, the center of the position sensor 170 may be aligned with the protrusion 111 of the bobbin 110 disposed between the coil blocks 120a and 120b. The distance between the coil blocks 120a and 120b may be easily changed by the movement distance of the moving unit and a non-magnetic partition wall 530 of the first magnet 130.

In this embodiment, the number of first magnets 130 is four. However, the disclosure is not limited thereto. The number of first magnets 130 may be at least two. The surface of the first magnet 140 that faces the first coil 120 may be flat. However, the disclosure is not limited thereto. The surface of the first magnet that faces the first coil may be curved.

As shown in FIG. 6A, the first coil 120 and the position sensor 170 may be disposed so as to overlap each other in a direction perpendicular to the optical axis. However, the disclosure is not limited thereto.

In another embodiment, the first coil 120 may be disposed at the lower side of the outer circumferential surface of the bobbin 110, the position sensor 170 may be disposed at the upper side of the outer circumferential surface of the bobbin 110, which is above the first coil 120, and the first coil 120 and the position sensor 170 may not overlap each other in a direction perpendicular to the optical axis.

For example, the center of the position sensor 170 may not overlap the first coil 120 in a direction perpendicular to the optical axis.

In addition, when the bobbin 110 moves in the first direction, which is parallel to the optical axis, the position relationship between the position sensor 170 and the first magnet 130 may be as follows, such that the position sensor 170 senses the period in which the intensity of the magnetic field emitted by the first magnet 130 is linearly changed.

Figure 14A:
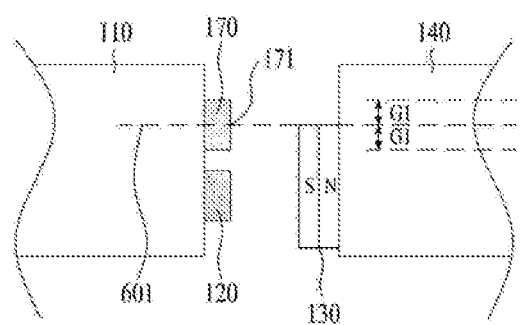
FIG. 14A is a view showing an embodiment of the disposition relationship between the first coil, the position sensor, and the first magnet.
Figure 14B:
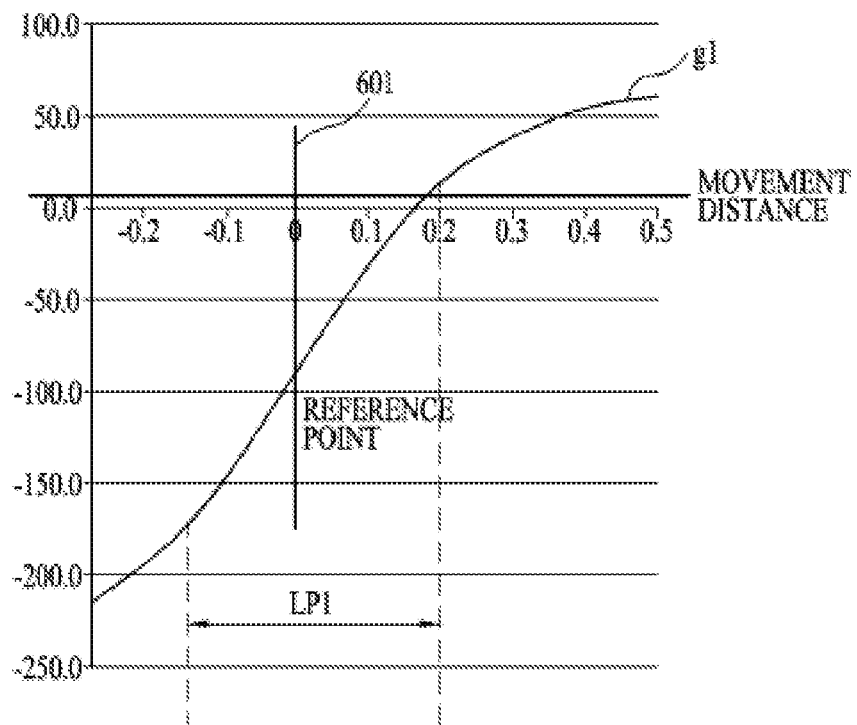
FIG. 14B is a view showing the change in magnetic flux of a monopolar magnetized first magnet sensed by the position sensor in response to the movement of the bobbin of FIG. 14A.

FIG. 14A is a view showing an embodiment of the disposition relationship between the first coil 120, the position sensor 170, and the first magnet 130, and FIG. 14B is a view showing the change in magnetic flux of a monopolar magnetized first magnet sensed by the position sensor 170 in response to the movement of the bobbin 110 of FIG. 14A.

Referring to FIGS. 14A and 14B, the first coil 120 may be disposed at the lower side of the outer circumferential surface of the bobbin 110, and the position sensor 170 may be disposed at the upper side of the outer circumferential surface of the bobbin 110 so as to be spaced apart from the first coil 120. The first magnet 130 may be disposed so as to overlap the first coil 120 along the optical axis or in a direction perpendicular to the optical axis. The first magnet 130 may be a monopolar magnetized first magnet that has different polarities at the inside and the outside thereof.

For example, the interface between the S pole and the N pole of the first magnet 130 may be parallel to a direction perpendicular to the direction in which the first magnet 130 and the first coil 120 are opposite each other. The first magnet 120 may be disposed such that the surface of the first magnet that faces the first coil 120 has an S pole and the opposite surface of the first magnet has an N pole. However, the disclosure is not limited thereto. The polarity of the magnet 130 may be reversed.

In the initial position, the position sensor 170 may overlap at least a portion of the first magnet 130 in a direction perpendicular to the optical axis. For example, at the initial position, the center 171 of the position sensor 170 may extend through the upper end of the first magnet 130, and may be aligned with a first horizontal reference line 601, which is perpendicular to the optical axis. The initial position may be the first position of the moving unit (e.g. the bobbin 110) in the state in which power is not supplied to the first coil 120 or a position at which the moving part is placed as the upper and lower elastic members 150 and 150 are elastically deformed only by the weight of the moving unit.

When the center 171 of the position sensor 170 is aligned with the first horizontal reference line 601 at the initial position, the position sensor 170 may sense a period LP1 of the magnetic flux, which is linearly changed. In addition, it can be seen that the center 171 of the position sensor 170 must be aligned so as not to deviate upward or downward from the first horizontal reference line 601 by more than 0.05 mm (G1; see FIG. 14A) in order to sense the period of the magnetic flux that is linearly changed.

Figure 15A:
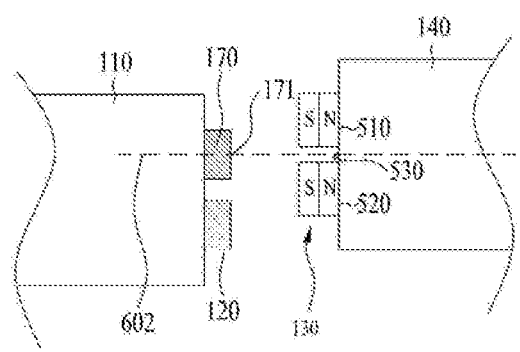
FIG. 15A is a view showing another embodiment of the disposition relationship between the first coil, the position sensor, and the first magnet.

FIG. 15A is a view showing another embodiment of the disposition relationship between the first coil 120, the position sensor 170, and the first magnet 130.

Referring to FIG. 15A, the first magnet 130 may be a bipolar magnetized first magnet that has different polarities at the upper side and the lower side thereof. The first magnet 130 may be generally classified as a ferrite magnet, an alnico magnet, or a rare-earth magnet. The first magnet 130 may be classified as a P-type magnet or an F-type magnet based on the type of magnetic circuit. However, the disclosure is not limited thereto.

The first magnet 130 may include a first sensing magnet 510, a second sensing magnet 520, and a non-magnetic partition wall 530.

The first sensing magnet 510 and the second sensing magnet 520 may be spaced apart from each other so as to face each other in a direction that is parallel to the optical axis, and the non-magnetic partition wall 530 may be disposed between the first sensing magnet 510 and the second sensing magnet 520.

In another embodiment, the first sensing magnet and the second sensing magnet may be spaced apart from each other so as to face each other in a direction that is perpendicular to the optical axis, and the non-magnetic partition wall may be disposed therebetween.

The non-magnetic partition wall 530, which is a portion that has substantially no magnetism, may include a section having weak polarity. In addition, the non-magnetic partition wall 530 may be filled with air, or may include a non-magnetic material.

At the initial position, the center 171 of the position sensor 170 may be aligned between the first sensing magnet 510 and the second sensing magnet 520 of the bipolar magnetized first magnet.

At the initial position, the center 171 of the position sensor 170 may be aligned with the non-magnetic partition wall 530 of the bipolar magnetized first magnet. For example, at the initial position, the center 171 of the position sensor 170 may be aligned with the non-magnetic partition wall 530, and may be aligned with a second horizontal reference line 602, which is perpendicular to the first magnet.

Figure 15B:
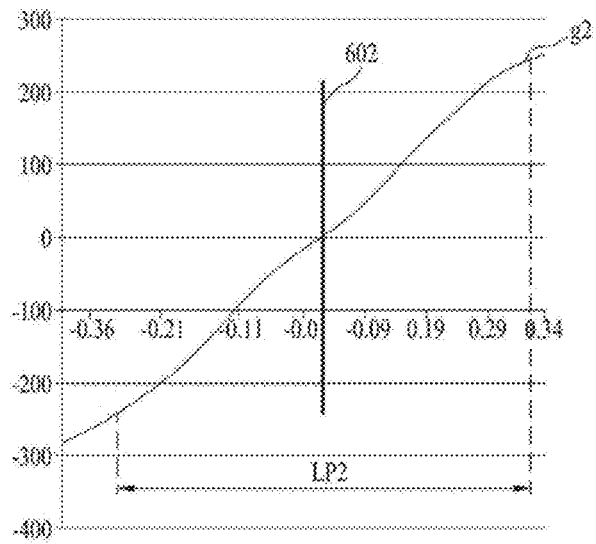
FIG. 15B is a view showing the change in magnetic flux of a bipolar magnetized first magnet sensed by the position sensor in response to the movement of the bobbin of FIG. 15A.

FIG. 15B is a view showing the change in magnetic flux of a bipolar magnetized first magnet sensed by the position sensor 170 in response to the movement of the bobbin 110 of FIG. 15A.

Referring to FIG. 15B, when the center 171 of the position sensor 170 is aligned with the second horizontal reference line 602 at the initial position, the position sensor 170 may sense a period LP2 of the magnetic flux that is linearly changed. In addition, it can be seen that the center 171 of the position sensor 170 must be aligned so as not to deviate upward or downward from the second horizontal reference line 602 by more than 0.05 mm in order to sense the period of the magnetic flux that is linearly changed.

In the case in which the first magnet 130 is commonly used for the position sensor 170 and the first coil 120, as in this embodiment, the position sensor 170 may be disposed so as to be adjacent to the first coil or to overlap the first coil 120 in the direction that is perpendicular to the optical axis. In this case, the position sensor 170 may be affected by the magnetic field of the first coil 120 in a high-frequency range, whereby the position sensor 170 may malfunction.

Figure 16:
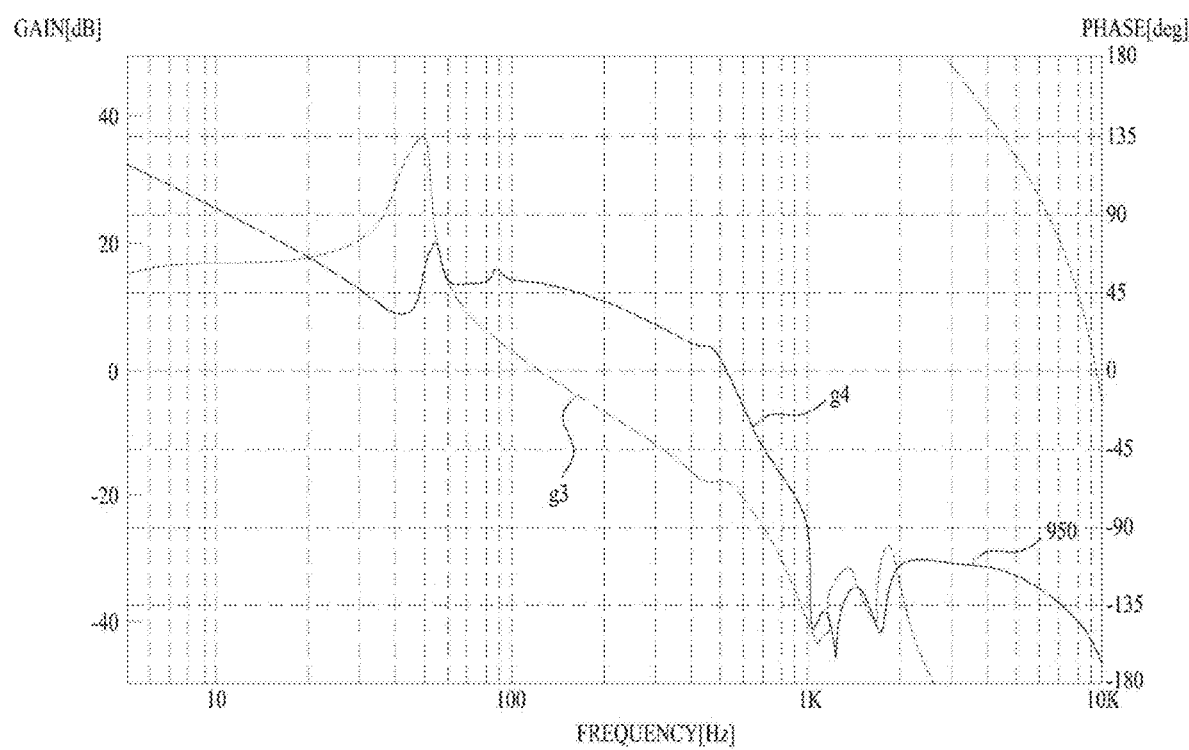
FIG. 16 is a graph showing an error of an AF position sensor, which is adjacent to an AF first coil.

FIG. 16 is a graph showing an error of an AF position sensor, which is adjacent to an AF first coil. g3 indicates the gain of the AF position sensor in the normal state thereof, and g4 indicates the gain of the AF position sensor when the AF position sensor is affected by the magnetic field of the first coil 120. The AF position sensor may be a Hall sensor.

Referring to FIG. 16, in a high-frequency range, e.g. in a range of 2 kHz or higher, the difference in gain between g4 and g3 is great (950). As a result, the gain of the AF position sensor may be erroneous in the high-frequency range.

In another embodiment, a first magnet for sensing only the position sensor 170 may be further provided to prevent the position sensor 170 from being erroneous or malfunctioning due to the magnetic field of the first coil 120 in the high-frequency range, in addition to the first magnet for moving. The reason for this is that, in the case in which the first magnet for sensing is mounted to the housing 140, the distance between the first coil 120 and the position sensor 170 may be increased, whereby the effect of the magnetic field of the first coil 120 acting on the position sensor may be reduced. In addition, the first magnet for sensing and the first magnet for moving may be optimally disposed at the housing 140, and the electromagnetic force between the first coil 120 and the first magnet may be increased, whereby the amount of current necessary to move the moving unit may be reduced and the stiffness of the upper and lower elastic members may be increased.

Next, the upper elastic member 150 and the lower elastic member will be described.

The upper elastic member 150 and the lower elastic member 160 are coupled to the bobbin 110 and the housing 140, and flexibly support the bobbin 110. In addition, at least one of the upper elastic member 150 and the lower elastic member 160 may be connected to the wires.

For example, at least one of the upper elastic member 150 and the lower elastic member 160 may be divided into two or more parts. The wires (e.g. 501 to 504) may connect at least one of the divided upper elastic members 150 and the divided lower elastic members 160 to the position sensor 170.

Figure 10:
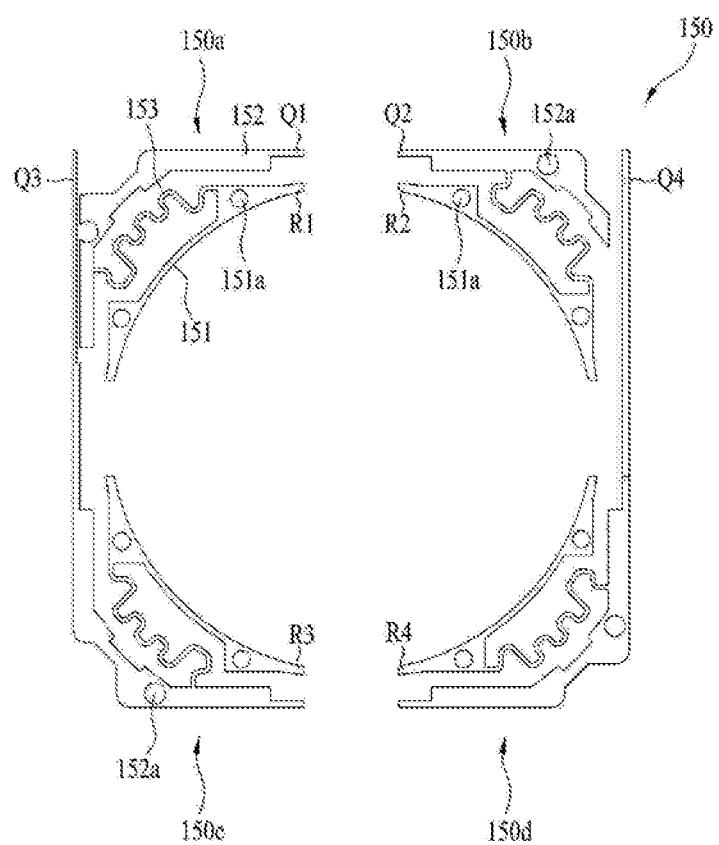
FIG. 10 is a plan view showing an upper elastic member of FIG. 1.
Figure 11:
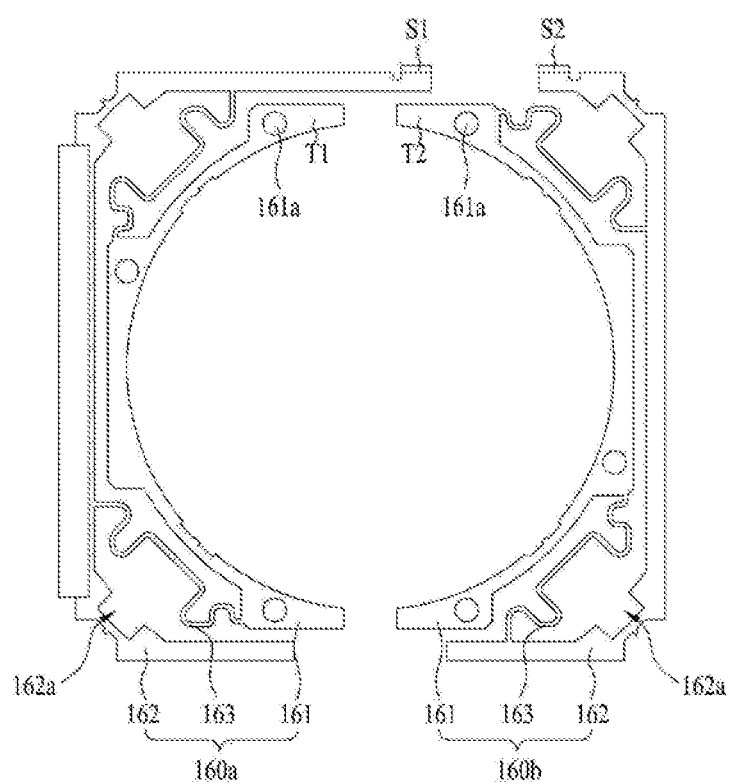
FIG. 11 is a plan view showing a lower elastic member of FIG. 1.

FIG. 10 is a plan view showing the upper elastic member 150 of FIG. 1, and FIG. 11 is a plan view showing the lower elastic member 160 of FIG. 1.

Referring to FIGS. 10 and 11, one of the upper and lower elastic members 150 and 160 may be divided into four or more parts, and the other may be divided into two or more parts. The wires 501 to 504 may be connected to corresponding ones of the divided upper and lower elastic members.

For example, the upper elastic member 150 may include first to fourth upper elastic members 150a to 150d, which are electrically separated from each other, and the lower elastic member 160 may include first and second lower elastic members 160a and 160b, which are electrically separated from each other. The upper elastic member 150 and the lower elastic member 160 may each be constituted by a leaf spring.

Each of the first to fourth upper elastic members 150a to 150d may include an inner frame 151 coupled to the bobbin 110, an outer frame 152 coupled to the housing 140, and a connection portion 153 for connecting the inner frame 151 and the outer frame 152 to each other.

Each of the first and second lower elastic members 160a and 160b may include an inner frame 161 coupled to the bobbin 110, an outer frame 162 coupled to the housing 140, and a connection portion 163 for connecting the inner frame 161 and the outer frame 162 to each other.

The connection portions 153 and 163 of the upper and lower elastic members 150 and 160 may be bent at least once to form a predetermined pattern. The upward and/or downward movement of the bobbin 110 in the first direction may be flexibly (or elastically) supported through the positional change and micro-scale deformation of the connection portions 153 and 163.

The inner frame 151 of the first upper elastic member 150a may be provided with a connection portion R1 that is connected to the other end of the first wire 501, and the inner frame 151 of the second upper elastic member 150b may be provided with a connection portion R2 that is connected to the other end of the second wire 502.

The outer frame 152 of the first upper elastic member 150a may be provided with a connection portion Q1 that is connected to the printed circuit board 250, and the outer frame 152 of the second upper elastic member 150b may be provided with a connection portion Q2 that is connected to the printed circuit board 250.

The inner frame 151 of the third upper elastic member 150c may be provided with a connection portion R3 that is connected to one end of the first coil 120 (e.g. the start portion of the first coil 120), and the inner frame 151 of the fourth upper elastic member 150d may be provided with a connection portion R4 that is connected to the other end of the first coil 120 (e.g. the end portion of the first coil 120).

The outer frame 152 of the third upper elastic member 150c may be provided with a connection portion Q3 that is connected to the printed circuit board 250, and the outer frame 152 of the fourth upper elastic member 150d may be provided with a connection portion Q4 that is connected to the printed circuit board 250.

For example, each of the connection portions Q3 and Q4 of the third and fourth upper elastic members 150c and 150d may be one end of the outer frame 152 that extends in the direction perpendicular to the optical axis, and may be connected to the printed circuit board 250.

The inner frame 161 of the first lower elastic member 160a may be provided with a connection portion T1 that is connected to the other end of the third wire 503, and the inner frame 161 of the second lower elastic member 160b may be provided with a connection portion T2 that is connected to the other end of the fourth wire 504.

The outer frame 152 of the first lower elastic member 160a may be provided with a connection portion S1 that is connected to the printed circuit board 250, and the outer frame 152 of the second lower elastic member 160b may be provided with a connection portion S2 that is connected to the printed circuit board 250.

Bonding between the printed circuit board 250 and the connection portions Q1 to Q4, S1, and S2, between the first to fourth wires 501 to 504 and the connection portions R1, R2, T1, and T2, and between the first coil 120 and the connection portions R3 and R4 may be achieved by thermal fusion and/or using an adhesive.

The first to fourth upper elastic members 150a to 150d may have a plurality of first through-holes 151a, which are formed in the inner frames 151 and coupled to the upper supporting protrusions 113 of the bobbin 110, and a plurality of second through-holes 152a, which are formed in the outer frames 152 and coupled to the upper frame supporting protrusions 144 of the housing 140.

The first and second lower elastic members 160a and 160b may have a plurality of third through-holes 161a, which are formed in the inner frames 151 and coupled to the lower supporting protrusions 114 of the bobbin 110, and a plurality of fourth through-holes 162a, which are formed in the outer frames 152 and coupled to the lower frame supporting protrusions 147 of the housing 140.

Bonding between the upper and lower elastic members 150 and 160 and the bobbin 110 and between the upper and lower elastic members 150 and 160 and the housing 140 may be achieved by thermal fusion and/or using an adhesive.

Next, the printed circuit board 250 will be described.

The printed circuit board 250 may be disposed at, coupled to, or mounted to the housing 140, and may be connected to at least one of the upper and lower elastic members 150 and 160. The printed circuit board 250 may be a flexible printed circuit board (FPCB).

For example, the printed circuit board 250 may be fixed to, supported by, or disposed at one of the four edges 140a to 140d of the housing 140. However, the disclosure is not limited thereto.

The printed circuit board 250 may have a plurality of terminals 171, and may transmit an electrical signal, received from the outside, to the first coil 120 and the position sensor 170.

For example, the printed circuit board 250 may include two terminals for supplying (+) power and (−) power to the first coil 120 and four terminals for (+) input, (−) input, (+) output, and (−) output of the position sensor 170.

A controller (not shown) for readjusting the amount of current to be supplied to the first coil 120 based on a displacement value sensed by the position sensor 170 may be mounted on the printed circuit board 250.

In another embodiment, the controller (not shown) may not be mounted on the printed circuit board 250 but may be mounted on an additional board that is connected to the printed circuit board 250. The additional board may be a board on which the image sensor of the camera module is mounted or another additional board.

Figure 12:
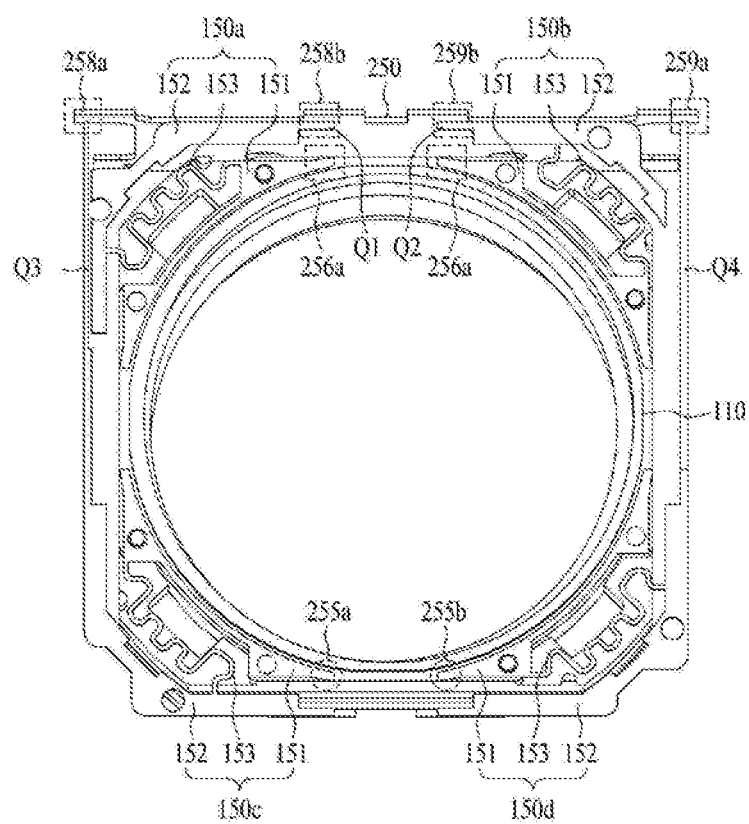
FIG. 12 is a view showing the connection between the printed circuit board and the upper elastic member and the connection between the first coil and the upper elastic member.

FIG. 12 is a view showing the connection between the printed circuit board 120 and the upper elastic member 150 and the connection between the first coil 120 and the upper elastic member.

Referring to FIG. 12, the connection portion R1 of the inner frame 151 of the first upper elastic member 150a may be connected (256a) to the other end of the first wire 501 (e.g. the first connection pad 501b), and the connection portion Q1 of the outer frame 152 of the first upper elastic member 150a may be connected (258b) to the first terminal of the printed circuit board 250.

The connection portion R2 of the inner frame 151 of the second upper elastic member 150b may be connected (257a) to the other end of the second wire 502 (e.g. the first connection pad 502b), and the connection portion Q2 of the outer frame 152 of the second upper elastic member 150b may be connected (259b) to the second terminal of the printed circuit board 250.

The connection portion R3 of the inner frame 151 of the third upper elastic member 150c may be connected (255a) to one end of the first coil 120, and the connection portion Q3 of the outer frame 152 of the third upper elastic member 150c may be connected (258a) to the third terminal of the printed circuit board 250.

The connection portion R4 of the inner frame 151 of the fourth upper elastic member 150d may be connected (255b) to the other end of the first coil 120, and the connection portion Q4 of the outer frame 152 of the fourth upper elastic member 150d may be connected (259a) to the fourth terminal of the printed circuit board 250.

Figure 13:
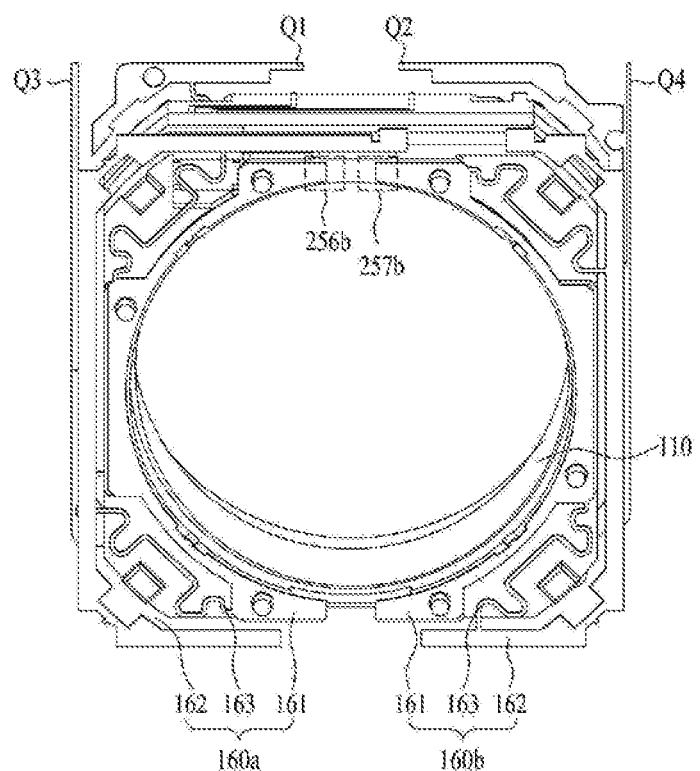
FIG. 13 is a view showing the connection between the lower elastic member and wires.

FIG. 13 is a view showing the connection between the lower elastic member 160 and the wires 503 and 504.

Referring to FIG. 13, the connection portion T1 of the inner frame 161 of the first lower elastic member 160a may be connected (256b) to the other end of the third wire 503 (e.g. the third connection pad), and the connection portion S1 of the outer frame 152 of the first lower elastic member 160a may be connected (not shown) to the third terminal of the printed circuit board 250.

The connection portion T2 of the inner frame 161 of the second lower elastic member 160b may be connected (257b) to the other end of the fourth wire 504 (e.g. the fourth connection pad), and the connection portion S2 of the outer frame 152 of the second lower elastic member 160b may be connected (not shown) to the fourth terminal of the printed circuit board 250.

(+) power and (−) power, supplied to the printed circuit board 250, may be supplied to the first coil 120 via the connections 258a, 255a, 259a, and 255b between the connection portions Q3, R3, Q4, and R4 of the third and fourth upper elastic members 150c and 150d and the first coil 120.

Electrical signals (e.g. a (+) input signal, a (−) input signal, a (+) output signal, and a (−) output signal) may be transmitted and received between the position sensor 170 and the printed circuit board 250 via the connections 256a, 257a, 256b, and 257b between the first to fourth wires 501 to 504 and the connection portions R1, R2, T1, and T2 of the first and second upper elastic members 150a and 150b, the connections 258b and 259b between the connection portions Q1 and Q2 of the first and second upper elastic members 150a and 150b and the printed circuit board 250, and the connections (not shown) between the connection portions S1 and S2 of the first and second lower elastic members 160a and 160b and the printed circuit board 250.

In FIGS. 12 and 13, four electrical signals of the position sensor 170 are transmitted via the two upper elastic members 150a and 150b, among the four divided upper elastic members 150a to 150d, and the two divided lower elastic members 160a and 160b, and (+) power and (−) power may be supplied from the printed circuit board 250 to the first coil 120 via the other two upper elastic members 150c and 150d. However, the disclosure is not limited thereto.

In another embodiment, four electrical signals of the position sensor 170 may be transmitted via the four divided upper elastic members 150a to 150d, and (+) power and (−) power may be supplied from the printed circuit board 250 to the first coil 120 via the two divided lower elastic members 160a and 160b. To this end, one end of each of the four wires 501 to 504 may be connected to a corresponding one of the position sensor pads P1 to P4, and the other end thereof may extend to the upper surface of the bobbin 110.

In FIGS. 12 and 13, the upper elastic member 150 is divided into four parts, and the lower elastic member 160 is divided into two parts. However, the disclosure is not limited thereto.

For example, in another embodiment, the upper elastic member 150 may be divided into two parts, and the lower elastic member 160 may be divided into four parts. Four electrical signals of the position sensor 170 are transmitted via the two lower elastic members, among the four divided lower elastic members, and the two divided upper elastic members, and (+) power and (−) power may be supplied from the printed circuit board 250 to the first coil 120 via the other two lower elastic members.

In addition, in another embodiment, four electrical signals of the position sensor 170 may be transmitted via the four divided lower elastic members, and (+) power and (−) power may be supplied from the printed circuit board 250 to the first coil 120 via the two divided upper elastic members. To this end, one end of each of the four wires 501 to 504 may be connected to a corresponding one of the position sensor pads P1 to P4, and the other end thereof may extend to the lower surface of the bobbin 110.

In addition, in another embodiment, one of the upper elastic member 150 and the lower elastic member 160 may be divided into a plurality of parts, and the other may not be divided. The wires 501 to 504 and the first coil 120 may be connected to the divided upper elastic members or the divided lower elastic members.

In FIGS. 12 and 13, the position sensor 170 is constituted by a Hall sensor alone. Alternatively, in the case in which the position sensor 170 is a structure including a Hall sensor and a driver, the following embodiments may be realized.

In the case in which the position sensor 170 is a structure including a Hall sensor and a driver, the number of wires may be six or more, and each of the six wires may be connected to a corresponding one of the six position sensor pads. Each of the first to fourth wires, among the six wires, may be connected to the inner frame of a corresponding one of the four divided upper elastic members 150a to 150d. Each of the fifth and sixth wires, among the six wires, may be connected to the inner frame of a corresponding one of the two divided lower elastic members 160a and 160b, or may be directly connected to one end or the other end of the first coil 120.

The outer frame of at least one of the four divided upper elastic members and the two divided lower elastic members may be connected to the printed circuit board 250.

In addition, in another embodiment, the lower elastic member 160 may be divided into four parts, and the upper elastic member 150 may be divided into two parts. Each of the first to fourth wires, among the six wires, may be connected to the inner frame of a corresponding one of the four divided lower elastic members. Each of the fifth and sixth wires, among the six wires, may be connected to the inner frame of a corresponding one of the two divided upper elastic members, or may be directly connected to one end or the other end of the first coil 120.

The outer frame of at least one of the two divided upper elastic members and the four divided lower elastic members may be connected to the printed circuit board 250.

The first power VCC, the second power GND, the synchronization clock signal SCL, and the data bit information SDA of the position sensor 170 may be transmitted via the first to fourth wires, and the powers VCM+ and VCM− may be supplied via the other wires, i.e. the fifth and sixth wires.

In addition, in another embodiment, three selected from among the first power VCC, the second power GND, the synchronization clock signal SCL, and the data bit information SDA may be transmitted via the first to third wires, and the other may be transmitted via one of the fifth and sixth wires. In addition, one of the powers VCM+ and VCM− may be supplied via the fourth wire, and the other of the powers VCM+ and VCM− may be supplied via the other of the fifth and sixth wires.

In the case in which the position sensor is further provided with test terminals, the lens moving apparatus may further include a number of wires corresponding to the number of test terminals. Each of the upper and lower elastic members 150 and 160 may be divided into four or more parts. Each of the added wires may be connected to the inner frame of a corresponding one of the divided upper and lower elastic members, and the outer frame of at least one of the divided upper and lower elastic members may be connected to the printed circuit board 250.

Next, the base 210 will be described.

The base 210 may be coupled to the cover member 300 to define a space for receiving the bobbin 110 and the housing 140. The base 310 may have a hollow corresponding to the hollow of the bobbin 110 and/or the hollow of the housing 140, and may be formed in a shape coinciding with or corresponding to the shape of the cover member 300, such as a quadrangular shape.

The base 210 may have a stair 211 (see FIG. 3), on which an adhesive is coated to fix the cover member 300 using the adhesive. The stair 211 may guide the cover member 300, which is coupled to the upper side thereof, and the distal end of the cover member 300 may be coupled to the stair 211 so as to be in surface contact therewith.

The base 210 may include guide members 216 protruding upward perpendicularly from the four corners thereof by a predetermined height. Each of the guide members 216 may be formed in the shape of a multi-angular prism. However, the disclosure is not limited thereto. The guide members 216 may be inserted, fastened, or coupled into the lower guide recesses 148 in the housing 140.

As current is supplied to the first coil 120, the moving unit (e.g. the bobbin) of the lens moving apparatus 100 may move in one direction of the optical axis, i.e. in the positive z-axis direction. However, the disclosure is not limited thereto.

In another embodiment, as current is supplied to the first coil 120, the moving unit of the lens moving apparatus 100 may move in both directions of the optical axis, i.e. in the positive z-axis direction and the negative z-axis direction, from the initial position, in order to easily calibrate the Hall sensor and to reduce the amount of current that is consumed. At the initial position, the moving unit may be floated by the upper and lower elastic members 150 and 160. For example, the maximum movement distance of the moving unit in the positive z-axis direction from the initial position may be greater than the maximum movement distance of the moving unit in the negative z-axis direction from the initial position.

In this embodiment, the position sensor receiving recess 513, in which the position sensor 170 is located, is provided in the bobbin 110. When current is supplied to the first coil 120, therefore, the bobbin 110 and the position sensor 170 may be stably movable together, thereby performing stable and accurate auto focusing.

In addition, in this embodiment, the wires 501 and 504, which connect the position sensor 170 and the printed circuit board 250 to each other and via which the transmission of data signals between the position sensor 170 and the printed circuit board 250 is possible, are provided at the outer circumferential surface of the bobbin 110, thereby achieving easy connection and performing stable and accurate auto focusing through accurate data transmission.

Figure 17:
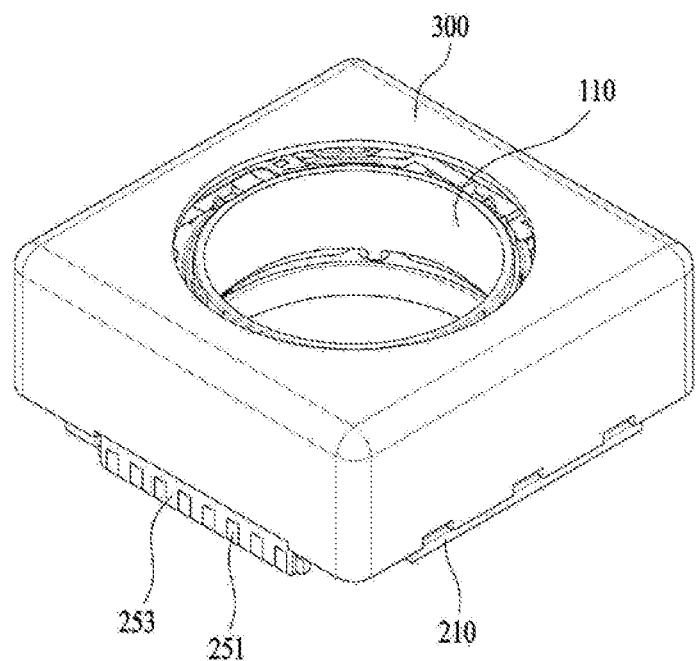
FIG. 17 is a perspective view showing a lens moving apparatus according to another embodiment.
Figure 18:
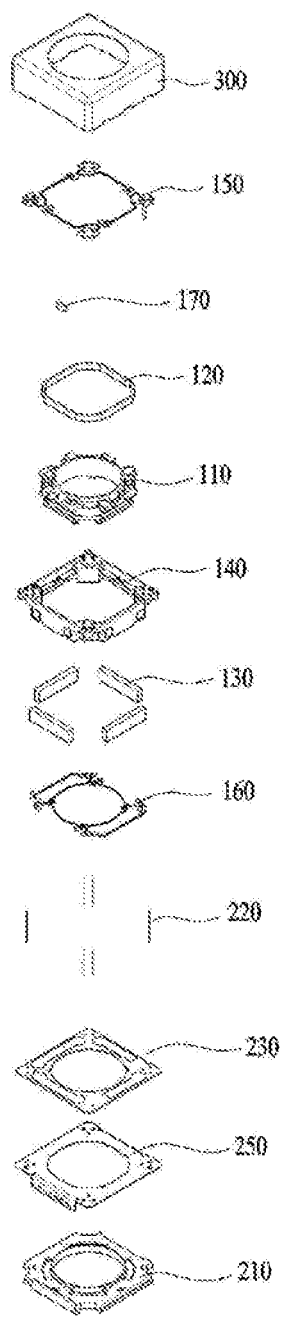
FIG. 18 is an exploded perspective view of the lens moving apparatus according to the another embodiment.

FIG. 17 is a perspective view showing a lens moving apparatus according to another embodiment. FIG. 18 is an exploded perspective view of the lens moving apparatus according to the another embodiment.

An optical image stabilization device used in a small-sized camera module mounted in a mobile device, such as a smartphone or a tablet PC, is a device configured to prevent the outline of a captured still image from being blurred due to vibration caused by the shaking of a user's hand when the image is captured.

In addition, an auto focusing device is a device for automatically focusing an image of a subject on the surface of an image sensor. The optical image stabilization device and the auto focusing device may be configured in various manners. In this embodiment, an optical module including a plurality of lenses may be moved in the first direction or in a direction perpendicular to the first direction in order to perform optical image stabilization and/or auto focusing.

As shown in FIGS. 17 and 18, the lens moving apparatus according to the embodiment may include a moving unit. The moving unit may perform auto focusing and optical image stabilization. The moving unit may include a bobbin 110, a first coil 120, a first magnet 130, a housing 140, an upper elastic member 150, a lower elastic member 160, and a position sensor 170.

The bobbin 110 may be provided inside the housing 300. The first coil 120, which is disposed inside the first magnet 130, may be provided on the outer circumferential surface of the bobbin 110. The bobbin 110 may be installed in the housing 140 so as to reciprocate in the first direction as the result of the electromagnetic interaction between the first magnet 130 and the first coil 120.

The first coil 120 may be installed on the outer circumferential surface of the bobbin 110 so as to electromagnetically interaction with the first magnet 130. For electromagnetic interaction, the first magnet 130 may be opposite the first coil and the position sensor 170, a description of which will follow.

In addition, the bobbin 1210 may be flexibly supported by the upper and lower elastic members 150 and 160 such that the bobbin moves in the first direction to perform auto focusing.

The bobbin 110 may include a lens barrel (not shown), in which at least one lens is installed. The lens barrel may be coupled to the inside of the bobbin 110 in various manners.

For example, the lens barrel may be coupled to the bobbin 110 by screw coupling between female threads formed in the inner circumferential surface of the bobbin 110 and male threads formed in the outer circumferential surface of the lens barrel so as to correspond to the female threads. However, the disclosure is not limited thereto. No threads may be formed in the inner circumferential surface of the bobbin 110, in which case the lens barrel may be directly fixed to the inside of the bobbin 110 using a method other than screw coupling.

Alternatively, one or more lenses may be integrally formed with the bobbin 110, without the lens barrel. In this embodiment, however, the lens moving apparatus includes a lens barrel.

A single lens may be coupled to the lens barrel, or two or more lenses may be coupled to the lens barrel in order to constitute an optical system.

Auto focusing may be controlled depending on the direction in which current flows. Auto focusing may be realized by moving the bobbin 110 in the first direction. For example, when forward current is supplied, the bobbin 110 may move upward from the initial position. When reverse current is supplied, the bobbin 110 may move downward from the initial position. Alternatively, the amount of current that flows in one direction may be adjusted to increase or decrease the movement distance of the bobbin from the initial position in one direction.

A plurality of upper supporting protrusions and a plurality of lower supporting protrusions may protrude from the upper surface and the lower surface of the bobbin 110, respectively. Each upper supporting protrusion may be formed in a cylindrical shape or a prism shape. The upper supporting protrusions may couple and fix the upper elastic member 150. In the same manner as in the upper supporting protrusions, each lower supporting protrusion may be formed in a cylindrical shape or a prism shape. The upper supporting protrusions may couple and fix the lower elastic member 160.

The upper elastic member 150 may be provided with holes corresponding to the upper supporting protrusions, and the lower elastic member 160 may be provided with holes corresponding to the lower supporting protrusions. The supporting protrusions and the holes may be fixed to each other by thermal fusion or using an adhesive member such as epoxy.

In another embodiment, the lower elastic member 160 may be coupled to the upper surface of the printed circuit board 250. For coupling between the lower elastic member 160 and the printed circuit board 250, for example, the base 210 may be provided with a plurality of protrusions, and the lower elastic member 160 may be provided with a plurality of through-holes corresponding in position and shape to the protrusions.

The protrusions of the base 250 may be coupled into the through-holes in the lower elastic member 160. The printed circuit board 250, which is disposed between the lower elastic member 160 and the base 250, is soldered to the lower elastic member 160, whereby the printed circuit board 250 and the lower elastic member 160 may be coupled to each other.

The housing 140 may have a hollow column shape for supporting the first magnet 130, and may be formed in an approximately quadrangular shape. The first magnet 130 and supporting members 220 may be coupled to the edge of the housing 140. In addition, as described above, the bobbin 110, which is guided by the housing 140 so as to move in the first direction, may be disposed on the inner circumferential surface of the housing 140.

The upper elastic member 150 and the lower elastic member 160 may be coupled to the housing 140 and the bobbin 110, and the upper elastic member 150 and the lower elastic member 160 may flexibly support the upward and/or downward movement of the bobbin 110 in the first direction. The upper elastic member 150 and the lower elastic member 160 may each be constituted by a leaf spring.

As shown in FIG. 18, the upper elastic member 150 may be divided into a plurality of separated parts. Due to such a multidivisional structure, currents having different polarities or different powers may be supplied to the divided parts of the upper elastic member 150. In addition, the lower elastic member 160 may have a multidivisional structure, and may be connected to the upper elastic member 150.

Meanwhile, the upper elastic member 150, the lower elastic member 160, the bobbin 110, and the housing 140 may be assembled through bonding performed by thermal fusion and/or using an adhesive.

The position sensor 170 may be coupled to the bobbin 110 so as to be movable together with the bobbin 110. The position sensor 170 may sense the upward and downward displacement of the bobbin 110 in the first direction, and may output the sensed result as a feedback signal, i.e. an electrical signal.

The upward and downward displacement of the bobbin 110 in the first direction may be adjusted based on the feedback signal, which is the result of sensing of the upward and downward displacement of the bobbin 110 in the first direction.

The position sensor 170 may be a sensor for sensing the change in magnetic force emitted by the first magnet 130. Here, the position sensor 170 may be a Hall sensor.

However, the above is illustrative. In this embodiment, the position sensor 170 is not limited to a Hall sensor. Any sensor capable of sensing a change in magnetic force may be used. In addition, any sensor capable of sensing position rather than magnetic force may be used. For example, the position sensor may be constituted by a photoreflector.

The position sensor 170 may be coupled to the bobbin 110 or the housing 140 in various manners. Current may be supplied to the position sensor 170 in various manners depending on how the position sensor 170 is coupled. In this embodiment, the position sensor 170 is coupled to the bobbin 110. Hereinafter, the concrete structure of the lens moving apparatus will be described based on this embodiment.

Meanwhile, the lens moving apparatus may further include an additional first magnet (not shown) for sensing, opposite the position sensor 170, or the first magnet 130 for moving may be used. When the bobbin 110 moves upward and downward in the first direction, the position sensor 170 may sense the change in magnetic force of the first magnet for sensing or the first magnet 130 to detect the upward and downward displacement of the bobbin 110 in the first direction.

In this embodiment, the position sensor 170 is configured to have a structure that senses the change in magnetic force of the first magnet 130. Hereinafter, the concrete structure of the lens moving apparatus will be described based on this embodiment.

The base 210 may be disposed at the lower part of the bobbin 110, and may be formed in an approximately quadrangular shape. The printed circuit board 250 may be located on the base 210.

The base 210 may be provided in the surface thereof facing the portion of the printed circuit board 250 at which a terminal surface 253 is formed with a supporting recess having a corresponding size. The supporting recess may be recessed inward from the outer circumferential surface of the base 210 by a predetermined depth in order to prevent the portion of the printed circuit board at which the terminal surface 253 is formed from protruding outward or to adjust the extent to which the portion of the printed circuit board protrudes outward.

The supporting members 220 may be disposed at the lateral surface of the housing 140. The upper side of each supporting member 220 may be coupled to the housing 140, and the lower side of each supporting member 220 may be coupled to the base 210. The supporting members 220 may support the bobbin 110 and the housing 140 such that the bobbin 110 and the housing 140 are movable in the second direction and the third direction, which are perpendicular to the first direction. In addition, the supporting members 220 may be connected to the first coil 120.

In this embodiment, four supporting members 220 may be disposed at the outer surfaces of the corners of the housing 140 in a symmetrical fashion. In addition, the supporting members 220 may be connected to the upper elastic member 150. That is, for example, the supporting members 220 may be connected to the portions of the upper elastic member 150 in which the through-holes are formed.

In addition, the supporting members 220 may be connected to the upper elastic member 150 using a conductive adhesive or by soldering, since the supporting members 220 are formed separately from the upper elastic member 150. Consequently, the upper elastic member 150 may supply current to the first coil 120 via the supporting members 220, which are connected to the upper elastic member.

Meanwhile, in FIG. 18, linear supporting members 220 are shown as an embodiment. However, the disclosure is not limited thereto. That is, each of the supporting members 220 may be formed in a plate shape.

A second coil 230 may move the housing 140 in the second direction and/or the third direction through electromagnetic interaction with the first magnet 130 to perform optical image stabilization.

Here, the second and third directions may include directions that are substantially similar to the x-axis direction and the y-axis direction, as well as the x-axis direction and the y-axis direction. That is, in the moving aspect of the embodiment, the housing 140 may move parallel to the x axis and the y axis. In addition, in the case in which the housing moves in the state of being supported by the supporting members 220, the housing may move in the state of being slightly oblique with respect to the x axis and the y axis.

Consequently, the first magnet 130 may be installed at a position corresponding to the second coil 230.

The second coil 230 may be disposed so as to be opposite the first magnet 130, which is fixed to the housing 140. In an embodiment, the second coil 230 may be disposed outside the first magnet 130. Alternatively, the second coil 230 may be disposed under the first magnet 130 so as to be spaced apart from the first magnet by a predetermined distance.

According to this embodiment, four second coils 230 may be installed at four sides of a circuit member 231. However, the disclosure is not limited thereto. Only two second coils, namely a second-direction second coil and a third-direction second coil, may be installed, or more than four second coils may be installed.

In this embodiment, a circuit pattern may be formed on the circuit member 231 so as to have the shape of the second coil 230, and an additional second coil may be disposed above the circuit member 231. However, the disclosure is not limited thereto. No circuit pattern may be formed on the circuit member 231 so as to have the shape of the second coil 230, but only an additional second coil 230 may be disposed above the circuit member 231.

Alternatively, a wire may be wound in the shape of a doughnut to constitute the second coil 230, or the second coil 230 may be formed in the shape of an FP coil and may be connected to the printed circuit board 250.

The circuit member 231 including the second coil 230 may be installed on the upper surface of the printed circuit board 250, which is disposed above the base 210. However, the disclosure is not limited thereto. The second coil 230 may be in tight contact with the base 210, may be spaced apart from the base by a predetermined distance, or may be formed at an additional board, which may be stacked on the printed circuit board 250.

The printed circuit board 250 may be connected to at least one of the upper elastic member 150 and the lower elastic member 160, may be coupled to the upper surface of the base 210, and may have therein through-holes, through which the supporting members 220 are inserted, formed at positions corresponding to the distal ends of the supporting members 220, as shown in FIG. 18.

The printed circuit board 250 may be provided with a terminal surface 253, at which terminals 251 are installed. The terminals 251 may be disposed at the terminal surface 253 to supply current to the first coil 120 and the second coil 230 upon receiving external power. The number of terminals formed at the terminal surface 253 may be increased or decreased depending on the kind of elements that need to be controlled. In addition, the printed circuit board 250 may have one terminal surface 253 or three or more terminal surfaces 253.

The cover member 300 may be generally formed in the shape of a box. The cover member 300 may receive the moving unit, the second coil 230, and a portion of the printed circuit board 250, and may be coupled to the base 210. The cover member 300 may protect the moving unit, the second coil 230, and the printed circuit board 250, which are received therein so as not to be damaged. In particular, the cover member 300 may prevent the electromagnetic field generated by the first magnet 130, the first coil 120, and the second coil 230 from leaking to the outside such that the electromagnetic field is condensed.

Figure 19A:
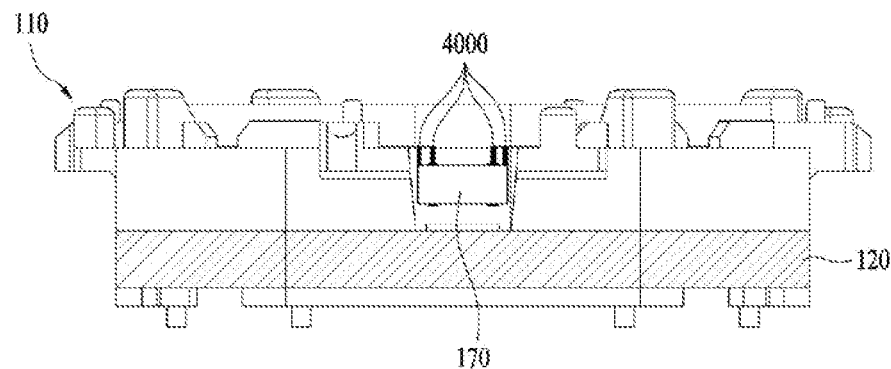
FIG. 19A is a side view showing a bobbin according to an embodiment.
Figure 19B:
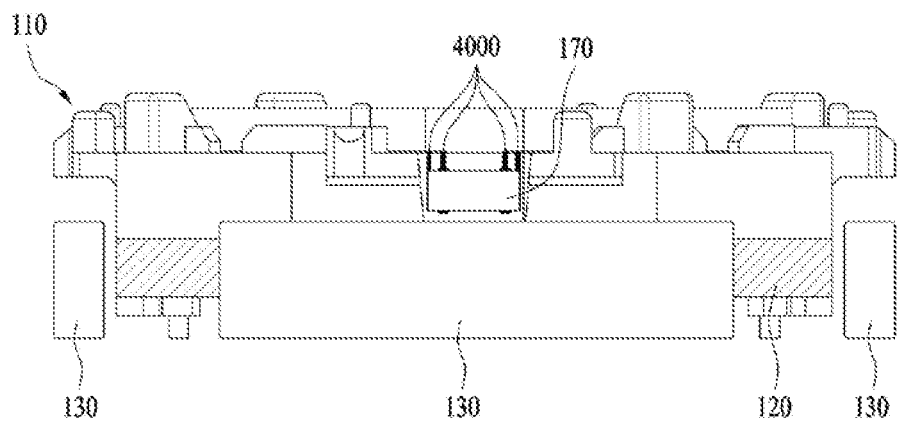
FIG. 19B is a side view showing the state in which a first magnet is disposed in FIG. 19A.

FIG. 19A is a side view showing a bobbin 110 according to an embodiment. FIG. 19B is a side view showing the state in which the first magnet 130 is disposed in FIG. 19A. FIG.

20 is a view showing the state in which a position sensor 170 according to an embodiment is removed from FIG. 19A.

Figure 20:
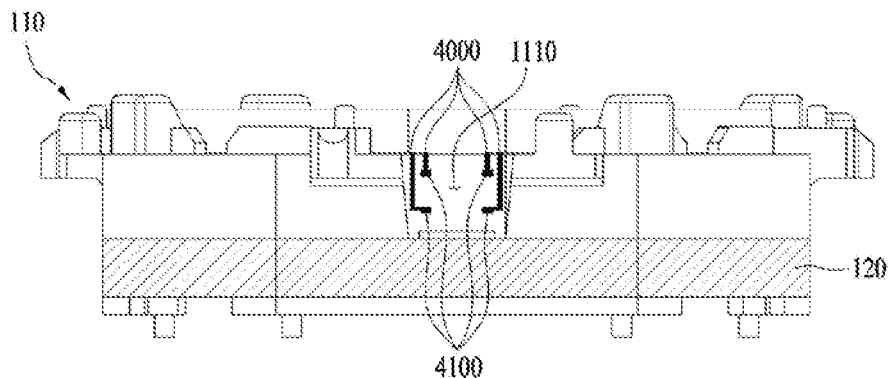
FIG. 20 is a view showing the state in which a position sensor according to an embodiment is removed from FIG. 19A.

The position sensor 170 may be coupled to the bobbin 110. For example, the bobbin 110 may be provided with a location recess 1110, in which the position sensor 170 is located. As shown in FIG. 20, the location recess 1110 may be provided with one end 4100 of a conductive pattern 4000, a surface electrode, a surface circuit, a surface circuit pattern, or a plating line, which is connected to the position sensor 170.

Figure 21:
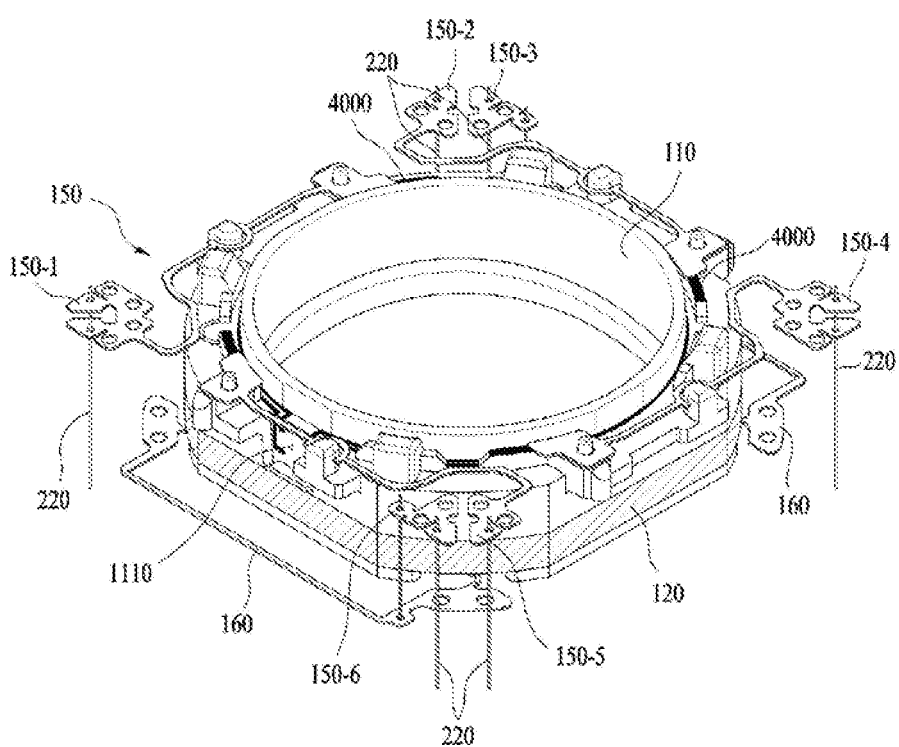
FIG. 21 is a perspective view showing some elements of a lens moving apparatus according to an embodiment.

Referring to FIG. 21, for example, the portion of the bobbin 110 at which the position sensor 170 is coupled to the bobbin 110 may be concave to form the location recess 1110. Since the location recess 1110 is formed concave in the bobbin 110, interference between the position sensor 170, which is coupled to the bobbin 110 in the state of being located in the location recess 1110, and other elements of the lens moving apparatus may be avoided when the bobbin 110 moves upward and downward in the first direction.

The position sensor 170 may be soldered to the end 4100 of the conductive pattern 4000, the surface electrode, the surface circuit, the surface circuit pattern, or the plating line so as to be coupled to the bobbin 110. Alternatively, the position sensor 170 may be coupled to the bobbin 110 using an adhesive such as epoxy. Alternatively, the position sensor 170 may be soldered to the end 4100 of the conductive pattern 4000, the surface electrode, the surface circuit, the surface circuit pattern, or the plating line, and at the same time may be adhered to the location recess 1110 using an adhesive such as epoxy, whereby the position sensor 170 may be securely coupled to the bobbin 110.

Meanwhile, as shown in FIGS. 19A and 19B, the position sensor 170 may be provided at the bobbin 110 so as to be spaced apart from the first coil 120 in the first direction. Since an electric field or a magnetic field may be generated by the first coil 120, to which current is supplied, the position sensor 170 may incorrectly sense the change in magnetic field of the first magnet 130 due to the electric field or the magnetic field generated by the first coil 120.

In order to prevent incorrect sensing of the position sensor 170, therefore, the first coil 120 and the position sensor 170 may be provided at the bobbin 110 so as to be spaced apart from each other by a predetermined distance in the first direction.

In this embodiment, as shown in FIGS. 19A, 19B, and 20, the conductive pattern 4000, the surface electrode, the surface circuit, the surface circuit pattern, or the plating line may be provided at the bobbin 110. The conductive pattern 4000, the surface electrode, the surface circuit, the surface circuit pattern, or the plating line may be formed on the surface of the bobbin 110 by plating, and may be connected to the position sensor 170.

The conductive pattern 4000, the surface electrode, the surface circuit, the surface circuit pattern, or the plating line may be formed on the surface of the bobbin 110, for example, by laser direct structuring (LDS). LDS is laser processing that forms a circuit pattern or a conduction line on the surface of an object using a laser. LDS may be performed as follows.

First, a laser is applied to the bobbin 110 to form a conductive pattern 4000, a surface electrode, a surface circuit, a surface circuit pattern, or a plating line on the bobbin 110. The bobbin 110, on which the conductive pattern 4000, the surface electrode, the surface circuit, the surface circuit pattern, or the plating line is formed, may be made of a thermoplastic resin material, such as a liquid crystal polymer (LCP) material. The portion of the bobbin 110 to which the laser is applied may be partially melted. The portion melted by the laser may have sufficient surface roughness to be plated.

Next, the pattern formed by the laser may be primarily plated with a primary metal. For example, nickel or copper, which exhibits high electrical conductivity, may be used as the primary metal used for primary plating.

Next, in the state in which the pattern has been plated with the primary metal, the upper surface of the primary metal may be secondarily plated with a secondary metal. For example, gold, which exhibits high electrical conductivity, corrosion resistance, and chemical resistance, may be used as the secondary metal used for secondary plating.

The primary metal and the secondary metal used for plating are not limited to the above embodiment. Any material that exhibits high electrical conductivity and is suitable for plating may be used.

Meanwhile, one end 4100 of the conductive pattern 4000, the surface electrode, the surface circuit, the surface circuit pattern, or the plating line, which is connected to the position sensor 170, may be formed in the location recess 1110, and the other end of the conductive pattern 4000, the surface electrode, the surface circuit, the surface circuit pattern, or the plating line may be connected to the upper elastic member 150. An embodiment of the connection between the conductive pattern 4000, the surface electrode, the surface circuit, the surface circuit pattern, or the plating line and the upper elastic member 150 will be described later with reference to FIGS. 21, 22A, and 22B.

Meanwhile, in this embodiment, as shown in FIG. 20, a plurality of conductive patterns 4000, surface electrodes, surface circuits, surface circuit patterns, or plating lines may be provided, and each of the conductive patterns 4000, the surface electrodes, the surface circuits, the surface circuit patterns, or the plating lines may be connected to the position sensor 170.

In this embodiment, four conductive patterns 4000, surface electrodes, surface circuits, surface circuit patterns, or plating lines may be formed on the bobbin 110, and each of the conductive patterns 4000, surface electrodes, surface circuits, surface circuit patterns, or plating lines may be connected to the position sensor 170.

The reason for this is that the position sensor 170 has two input terminals and two output terminals. Consequently, the number of conductive patterns 4000, surface electrodes, surface circuits, surface circuit patterns, or plating lines may be adjusted based on the number of input terminals and output terminals of the position sensor 170. In this case, the number of conductive patterns 4000, surface electrodes, surface circuits, surface circuit patterns, or plating lines may be equal to the sum of the number of input terminals and the number of output terminals of the position sensor 170.

For example, a Hall sensor or an MR sensor may be used as the position sensor 170. The position sensor 170 may be located on the bobbin 110 in the horizontal direction or in the vertical direction.

The position sensor 170 may be located on the bobbin so as to measure the electromagnetic force of the first magnet for both sensing and moving, and may partially overlap the first magnet 130.

The position sensor 170 may be positioned so as to be opposite the central portion of the first magnet 130 or to be eccentric relative to the central portion of the first magnet 130 such that a design space for the bobbin is secured, whereby the bobbin 110 may have an appropriate thickness. Because the position sensor 170 is positioned as described, the reliability of the bobbin 110 and the position sensor 170 may be secured, and the bobbin 110 may be easily injection-molded.

Meanwhile, the first coil 120 may be disposed at the upper side or the lower side of the bobbin 110 in order to prevent deterioration in the sensing characteristics of the position sensor 170 due to a high frequency, or the first coil 120 may be disposed at the upper surface of the bobbin 110 in order to protect the soldered portion of the position sensor 170.

In the case in which the position sensor 170 and the driver for driving the position sensor are integrally formed, the conductive pattern 4000 may be directly connected to a integrated circuit (IC) of the driver.

Figure 22A:
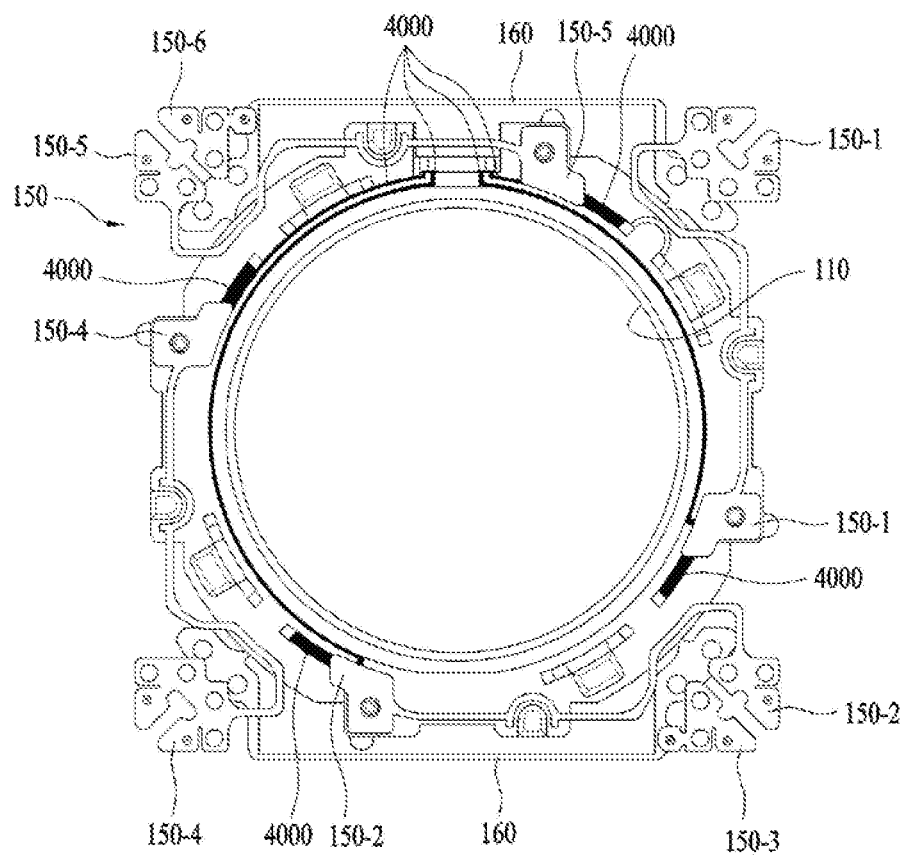
FIG. 22A is a plan view of FIG. 21.
Figure 22B:
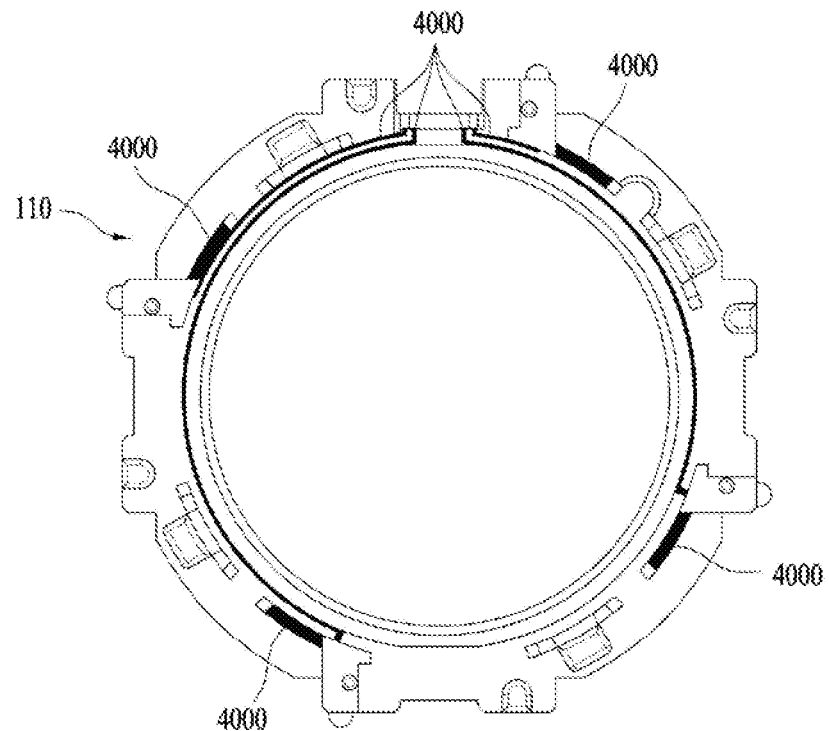
FIG. 22B is a plan view of FIG. 22A, from which some elements are removed.

FIG. 21 is a perspective view showing some elements of a lens moving apparatus according to an embodiment. FIG. 22A is a plan view of FIG. 21. FIG. 22B is a plan view of FIG. 22A, from which some elements are removed.

A plurality of conductive patterns 4000, surface electrodes, surface circuits, surface circuit patterns, or plating lines may be provided. Consequently, the upper elastic member 150 may be divided into at least the same number of parts as the number of conductive patterns 4000, surface electrodes, surface circuits, surface circuit patterns, or plating lines.

In this embodiment, as shown in FIGS. 21, 22A, and 22B, four conductive patterns 4000, surface electrodes, surface circuits, surface circuit patterns, or plating lines may be provided, the upper elastic member 150 may be divided into six parts, and the four conductive patterns 4000, surface electrodes, surface circuits, surface circuit patterns, or plating lines may be connected to four of the six divided parts of the upper elastic member.

Since the position sensors have two input terminals and two output terminals, as described above, four conductive patterns 4000, surface electrodes, surface circuits, surface circuit patterns, or plating lines may be provided.

The upper elastic member 150 may be connected to the conductive patterns 4000, the surface electrodes, the surface circuits, the surface circuit patterns, or the plating lines, and may be connected to the supporting members 220. In addition, the supporting members 220 may be connected to the printed circuit board 250.

In the above structure, the position sensor 170 may be connected to the printed circuit board 250 via the conductive patterns 4000, the surface electrodes, the surface circuits, the surface circuit patterns, or the plating lines, the upper elastic member 150, and the supporting members 220. The input terminals and the output terminals of the position sensor 170 may be independently connected to the printed circuit board 250, and the position sensor 170 may receive current from the printed circuit board 250 or may transmit a sensed value to the printed circuit board 250.

Meanwhile, in this embodiment, the upper elastic member 150 may be divided into six parts, four of which may be connected to the conductive patterns 4000, surface electrodes, surface circuits, surface circuit patterns, or plating lines and the supporting members 220. In addition, the other two may be connected to the lower elastic member 160 and the supporting members 220.

The other two of the divided parts of the upper elastic member 150 may be connected to the first coil 120, which is connected to the lower elastic member 160. Since it is necessary for both ends of the first coil 120 to be independently connected to the printed circuit board 250, the lower elastic member 160 may be divided into two parts.

Consequently, both ends of the first coil 120 may be connected to the printed circuit board 250 via the lower elastic member 160, two of the divided parts of the upper elastic member 150, and the support members 220 in order to receive necessary current from the printed circuit board 250.

It is necessary for the two divided parts of the lower elastic member 160 and two of the six divided parts of the upper elastic member 150 to be connected to each other, which may be achieved using various structures. For example, as shown in FIG. 21, the lower elastic member 160 and the upper elastic member 150 may be connected to each other via an additional electrical conduction member.

In another embodiment, although not shown, a portion of the lower elastic member 160 or the upper elastic member 150 may be bent in the first direction and extend so as to be used as a connection member.

An embodiment of the connection relationship between the conductive patterns 4000, surface electrodes, surface circuits, surface circuit patterns, or plating lines and the upper elastic member 150 will be described with reference to FIGS. 21, 22A, and 22B. In this embodiment, the upper elastic member 150 may be divided into six parts.

That is, the upper elastic member 150 may be divided into a first upper elastic member 150-1, a second upper elastic member 150-2, a third upper elastic member 150-3, a fourth upper elastic member 150-4, a fifth upper elastic member 150-5, and a sixth upper elastic member 150-6.

The first upper elastic member 150-1, the second upper elastic member 150-2, the fourth upper elastic member 150-4, and the fifth upper elastic member 150-5 may be connected to the four conductive patterns 4000, surface electrodes, surface circuits, surface circuit patterns, or plating lines in order to connect the position sensor 170 and the printed circuit board 250 to each other.

Since the conductive patterns 4000, the surface electrodes, the surface circuits, the surface circuit patterns, or the plating lines are formed on the surface of the bobbin 110 by LDS, a laser may be applied to the surface of the bobbin 110 to form a pattern having a desired shape and position. Consequently, the conductive patterns 4000, the surface electrodes, the surface circuits, the surface circuit patterns, or the plating lines, which are formed so as to coincide with the pattern, may be formed on a desired position of the surface of the bobbin 110 so as to have a desired shape.

Meanwhile, the conductive patterns 4000, the surface electrodes, the surface circuits, the surface circuit patterns, or the plating lines may be coupled and connected to the upper elastic member 150 by soldering. In this embodiment, as shown in FIGS. 22A and 22B, the four conductive patterns 4000, surface electrodes, surface circuits, surface circuit patterns, or plating lines, which are connected to the position sensor 170 having the four input or output terminals, may be formed on the surface of the bobbin 110 so as not to be electrically shorted.

In addition, in this embodiment, the four conductive patterns 4000, surface electrodes, surface circuits, surface circuit patterns, or plating lines may be coupled and connected to the first upper elastic member 150-1, the second upper elastic member 150-2, the fourth upper elastic member 150-4, and the fifth upper elastic member 150-5 by soldering.

Meanwhile, the third upper elastic member 150-3 and the sixth upper elastic member 150-6 may be connected to the two divided parts of the lower elastic member 160 in order to connect the first coil 120 and the printed circuit board 250 to each other.

In the above description, the upper elastic member 150 is divided into six parts and the lower elastic member 160 is divided into two parts in order to connect both ends of the first coil 120 and the position sensor 170, which has the four input or output terminals, to the printed circuit board 250. However, the disclosure is not limited thereto.

The upper elastic member 150 or the lower elastic member 160 may be divided into various numbers of parts in various manners depending on the number of terminals of the elements that need to be connected to the printed circuit board 250.

Meanwhile, in at least a portion of the region of the bobbin 110 at which the conductive patterns 4000, the surface electrodes, the surface circuits, the surface circuit patterns, or the plating lines are formed, an adhesive (not shown) may be coated on the surface of the bobbin 110 and the upper surface of the conductive patterns 4000, the surface electrodes, the surface circuits, the surface circuit patterns, or the plating lines. The conductive patterns 4000, the surface electrodes, the surface circuits, the surface circuit patterns, or the plating lines, which are formed on the surface of the bobbin 110, may be peeled from the surface of the bobbin 110 during the formation thereof or during the use of the lens moving apparatus.

In the case in which the conductive patterns 4000, the surface electrodes, the surface circuits, the surface circuit patterns, or the plating lines are peeled from the surface of the bobbin 110, the conductive patterns 4000, the surface electrodes, the surface circuits, the surface circuit patterns, or the plating lines may come into contact with each other, which may lead to an electrical short, or the conductive patterns 4000, the surface electrodes, the surface circuits, the surface circuit patterns, or the plating lines may be broken or damaged, which may lead to malfunction of the lens moving apparatus.

In order to prevent the conductive patterns 4000, the surface electrodes, the surface circuits, the surface circuit patterns, or the plating lines from being peeled from the surface of the bobbin 110, therefore, an adhesive such as epoxy may be coated on the portion of the surface of the bobbin 110 at which the conductive patterns 4000, the surface electrodes, the surface circuits, the surface circuit patterns, or the plating lines are formed such that the conductive patterns 4000, the surface electrodes, the surface circuits, the surface circuit patterns, or the plating lines are securely coupled to the surface of the bobbin 110.

Figure 23:
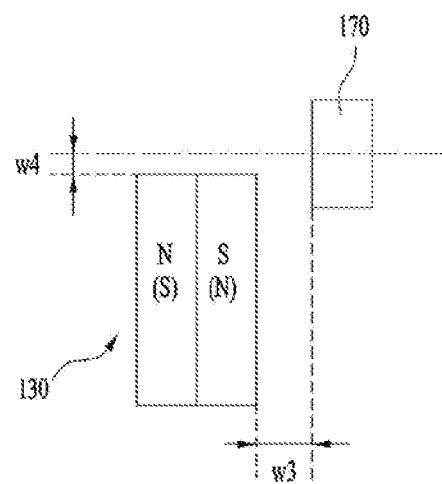
FIG. 23 is a view showing the disposition of a first magnet and a position sensor according to an embodiment.
Figure 24:
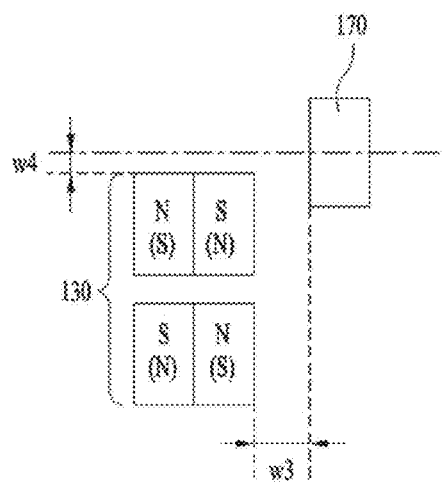
FIG. 24 is a view showing the disposition of a first magnet and a position sensor according to another embodiment.

FIG. 23 is a view showing the disposition of a first magnet 130 and a position sensor 170 according to an embodiment. FIG. 24 is a view showing the disposition of a first magnet 130 and a position sensor 170 according to another embodiment.

In an embodiment, as shown in FIG. 23, a single first magnet 130 may be provided. The first magnet 130 may be configured such that the N pole and the S pole are disposed in the second direction or the third direction, which is perpendicular to the first direction.

In another embodiment, as shown in FIG. 24, a plurality of first magnets 130 may be provided in the first direction. Each of the first magnets 130 may be configured such that the N pole and the S pole are disposed in the second direction or the third direction, which is perpendicular to the first direction.

The first magnets 130 may be disposed so as to have different polarities in the first direction. In the case in which a plurality of first magnets 130 is provided, the magnetic force of the first magnets 130 may be greater than in the case in which a single first magnet is provided. Consequently, auto focusing of the lens moving apparatus may be efficiently controlled.

Meanwhile, in the case in which a plurality of first magnets 130 is provided, the relationship between the magnetic flux of the first magnets 130 and the upward and downward movement, i.e. the movement distance, of the bobbin 110 in the first direction exhibits further improved linearity than in the case in which a single first magnet is provided, whereby the position sensor 170 may more accurately sense the movement distance of the bobbin 110 in the first direction, which will be described hereinafter in detail with reference to FIG. 24.

In addition, the first magnet 130 and the position sensor 170 may be provided at opposite surfaces so as to be spaced apart from each other. The position sensor 170 may sense the change in magnetic force of the first magnet 130 in response to the movement of the bobbin 110 in the first direction to measure the value of displacement of the bobbin 110 in the first direction.

In order for the position sensor 170 to accurately and effectively sense the change in magnetic force of the first magnet 130, therefore, the first magnet 130 and the position sensor 170 may be spaced apart from each other by a predetermined distance w3 in the second direction or in the third direction.

The distance w3 between the first magnet 130 and the position sensor 170 may be 0.01 mm to 0.5 mm. More appropriately, the distance w3 may be 0.05 mm to 0.3 mm.

The center of the position sensor 170 may be positioned within a predetermined distance from the upper end or the lower end of the first magnet 130 in the first direction. The position sensor 170 may sense the change in magnetic force of the first magnet 130 in the central region thereof.

Consequently, the center of the position sensor 170 must be positioned within a predetermined distance from the first magnet 130 in the first direction such that the position sensor can accurately and effectively sense the change in magnetic force of the first magnet 130.

A second distance w4 from the center of the position sensor 170 to the upper end or the lower end of the first magnet 130 may be 1 mm or less. More appropriately, the second distance w4 may be 0.5 mm or less.

In FIGS. 23 and 24, the center of the position sensor 170 is positioned above the first magnet 130, whereby the second distance w4 is the distance between the center of the position sensor 170 and the upper end of the first magnet 130.

In the case in which the center of the position sensor 170 is positioned under the first magnet 130, however, the second distance w4 may be the distance between the center of the position sensor 170 and the lower end of the first magnet 130.

Figure 25:
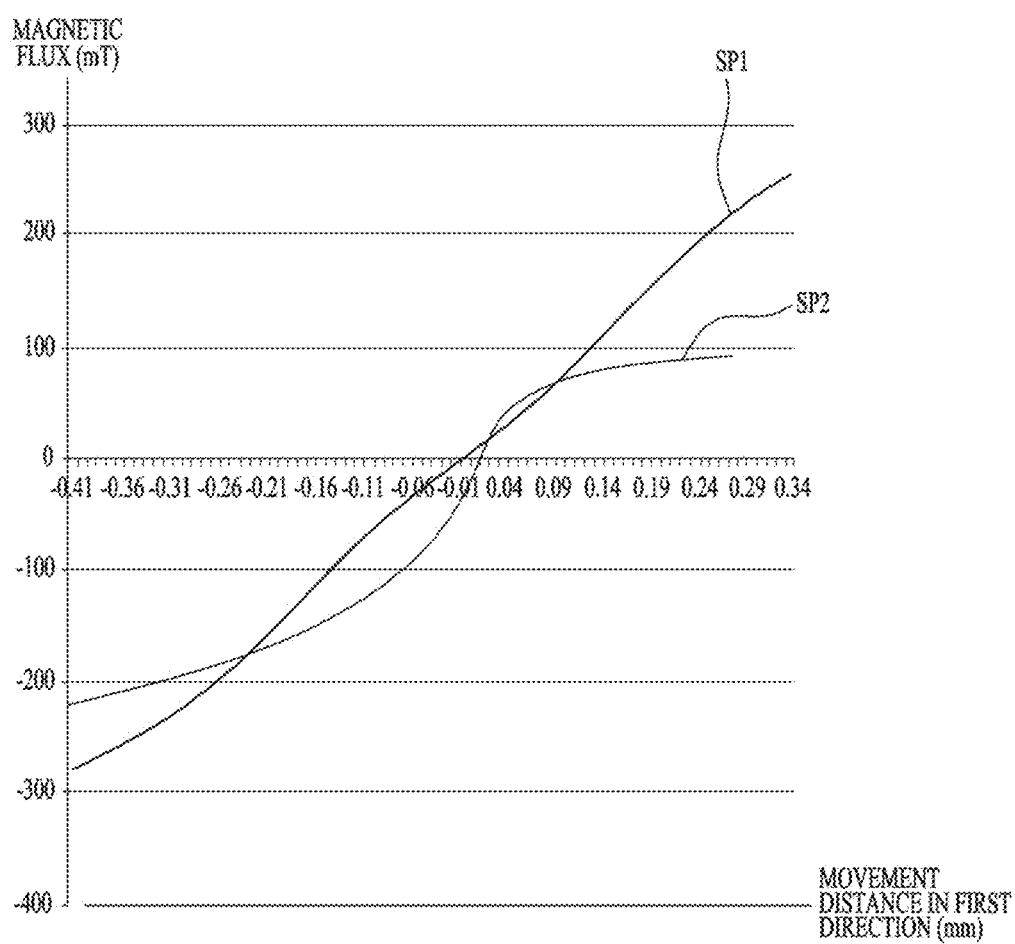
FIG. 25 is a graph showing the relationship between the magnetic flux of the first magnet and the movement distance of the bobbin in a first direction.

FIG. 25 is a graph showing the relationship between the magnetic flux of the first magnet and the movement distance of the bobbin 110 in the first direction. The movement distance of the bobbin in the first direction may be measured by the position sensor 170.

In the graph, curve SP1 indicates in the case in which the lens moving apparatus includes two first magnets 130, and curve SP2 indicates the case in which the lens moving apparatus includes a single first magnet 130.

As can be seen from FIG. 25, in the case in which two first magnets 130 are provided, the curve is changed more linearly than in the case in which a single first magnet 130 is provided. The greater the linearity of the curve, the more accurately the position sensor 170 may measure the movement distance of the bobbin 110 in the first direction.

From the aspect of accuracy of the position sensor in measuring the movement distance of the bobbin 110 in the first direction, therefore, a plurality of first magnets 130 may be provided.

However, whether the lens moving apparatus includes a single first magnet 130 or two or more first magnets 130 may be appropriately determined in consideration of the overall structure of the lens moving apparatus, manufacturing costs of the lens moving apparatus, or other design factors.

Figure 26:
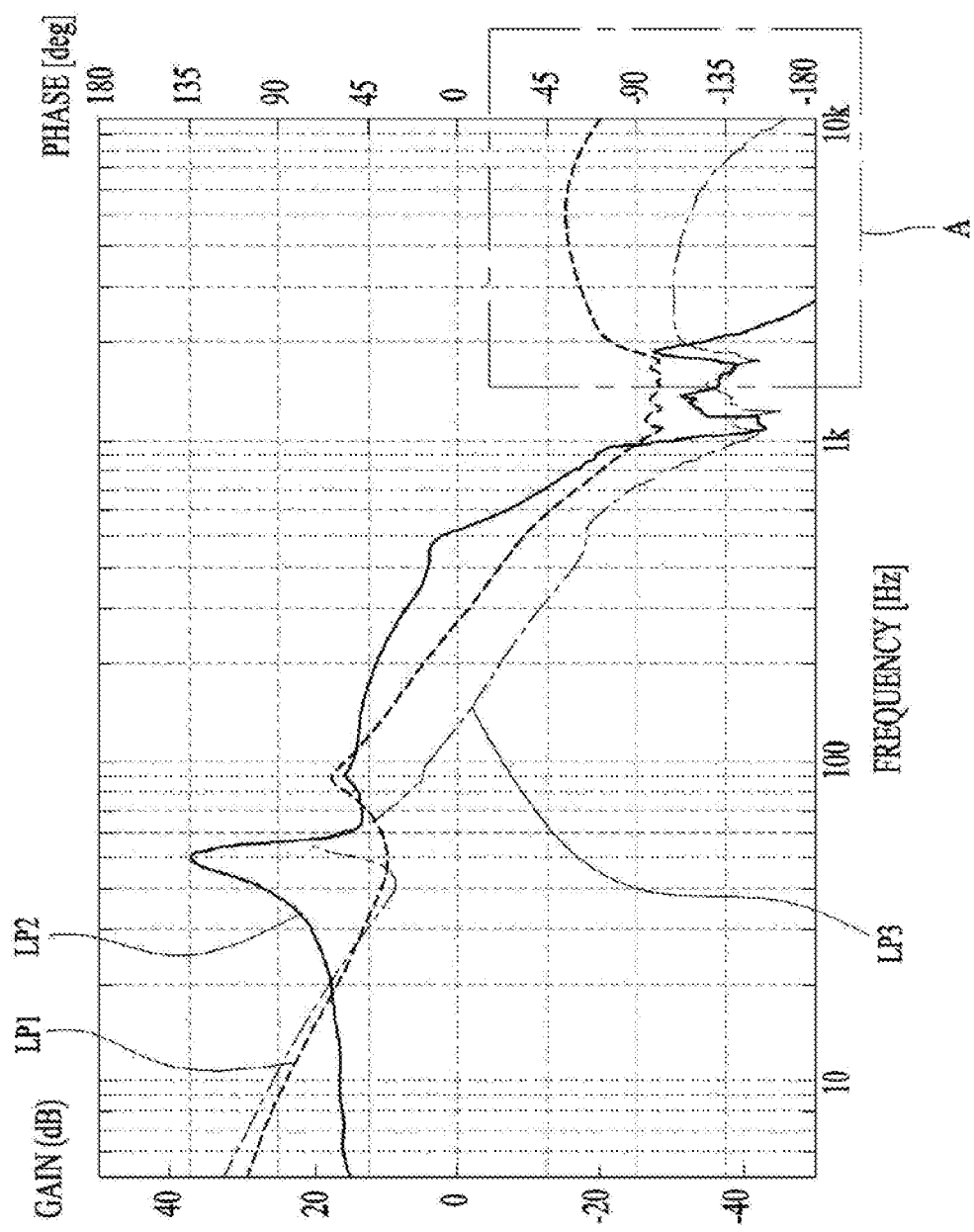
FIG. 26 is a graph showing the results of experimentation on the moving characteristics of a lens moving apparatus according to an embodiment.

FIG. 26 is a graph showing the results of experimentation on the moving characteristics of a lens moving apparatus according to an embodiment. In the graph, the gain is the sensing value of the position sensor 170, which may be converted into the displacement value of the position sensor 170 in the first direction through appropriate conversion.

In the graph, the gain of a lens moving apparatus according to an embodiment in which the position sensor 170 is provided at the bobbin 110 so as to be spaced apart from the first coil 120 in the first direction is denoted by LP1.

In the graph, the gain of a lens moving apparatus configured to have a structure in which the position sensor 170 is provided at the bobbin 110 so as not to be spaced apart from the first coil 120 in the first direction, i.e. a structure in which the position sensor 170 entirely or partially overlaps the first coil 120 in the second direction or in the third direction, is denoted by LP2.

In the graph, the phase is a current input value of the first coil, which may be converted into the displacement value of the bobbin 110 in the first direction through appropriate conversion. In the graph, the phase is denoted by LP3.

The displacement value of the position sensor 170 in the first direction and the displacement value of the bobbin 110 in the first direction coincide with each other. As LP1 or LP2 coincides with LP3 if possible, therefore, error in the sensing value from the position sensor 170 may be reduced.

In the graph, it can be seen that graph LP3 continuously decreases as the frequency is increased in period A. However, it can be seen that graph LP1 or LP2 increases in period A.

When comparing graphs LP1 and LP2 in period A, as the frequency is increased, LP1 is increased with a greater width than LP3, and the increased width is generally uniform.

As the frequency in increased, LP2 is increased further than LP3. However, the increased width is considerably smaller than that of LP1. As the frequency is further increased after the increase of the gain, the gain is reduced.

When comparing graphs LP1 and LP2, LP2 is more similar to LP3 than LP1. This reveals that, in a lens moving apparatus according to an embodiment in which the position sensor 170 is provided at the bobbin 110 so as to be spaced apart from the first coil 120 in the first direction, the sensing error value of the position sensor 170, which is based on the current flowing in the first coil 120, is smaller than in a lens moving apparatus having a structure different from the above structure.

In this embodiment, the position sensor 170, which is provided on the bobbin 110, may be connected to the upper elastic member 150 using the conductive pattern 4000, the surface electrode, the surface circuit, the surface circuit pattern, or the plating line, which are formed on the surface of the bobbin 110, whereby the structure of the lens moving apparatus may be simplified.

In addition, in the case in which the conductive pattern 4000, the surface electrode, the surface circuit, the surface circuit pattern, or the plating line, which are formed on the surface of the bobbin 110, are used, interference between elements constituting the lens moving apparatus may be reduced considerably more than in the case in which an additional structure for connection or an electrical conduction member is used.

Meanwhile, the lens moving apparatus according to the embodiment described above may be used in various fields, such as for a camera module. For example, the camera module may be applied to a mobile device, such as a mobile phone.

A camera module according to an embodiment may include a lens barrel coupled to a bobbin 110, an image sensor (not shown), a printed circuit board 250, and an optical system.

The lens barrel may be configured as described above, and the printed circuit board 250, which is a portion on which the image sensor is mounted, may define the bottom surface of the camera module.

In addition, the optical system may include at least one lens for transmitting an image to the image sensor. An actuator module for performing auto focusing and optical image stabilization may be installed in the optical system. The actuator module for performing auto focusing may be configured in various manners. A voice coil unit motor is generally used. The lens moving apparatus according to the embodiment described above may serve as an actuator module for performing both auto focusing and optical image stabilization.

In addition, the camera module may further include an infrared cut-off filter (not shown). The infrared cut-off filter prevents infrared light from being incident on the image sensor. In this case, the infrared cut-off filter may be installed at the base 210 shown in FIG. 18 at a position corresponding to the image sensor, and may be coupled to a holder member (not shown). In addition, the base 210 may support the lower side of the holder member.

An additional terminal member for electrical conduction with the printed circuit board 250 may be installed at the base 210, or a terminal may be integrally formed using a surface electrode. Meanwhile, the base 210 may perform a sensor holder function for protecting the image sensor. In this case, a protrusion may be formed downward along the lateral surface of the base 210, which, however, is not requisite. Although not shown, an additional sensor holder may be disposed under the base 210 so as to perform the above function.

Although only a few embodiments have been described above, various other embodiments may be configured. The technical features of the embodiments described above may be combined into various forms unless the technical features are incompatible with each other, in which case it is possible to configure new embodiments.

INDUSTRIAL APPLICABILITY

Embodiments provide a lens moving apparatus that is capable of performing stable and accurate auto focusing. Consequently, the embodiments have industrial applicability.

The invention claimed is:
1. A lens moving apparatus comprising:
a bobbin having a first coil disposed on an outer circumferential surface thereof;
a position sensor disposed on the outer circumferential surface of the bobbin, the position sensor being configured to move together with the bobbin;
a first magnet disposed so as to be opposite the first coil;
a housing configured to support the first magnet;

upper and lower elastic members coupled to the bobbin and the housing; and a plurality of wires disposed on the outer circumferential surface of the bobbin for connecting at least one of the upper and lower elastic members to the position sensor, wherein the bobbin has a receiving recess in which the position sensor is disposed, the receiving recess comprising a bottom and a sidewall.

2. The lens moving apparatus according to claim 1, comprising:

pads disposed on at least one of a bottom and a sidewall of the receiving recess so as to be connected to the position sensor, wherein one end of each of the wires is connected to a corresponding one of the pads.

3. The lens moving apparatus according to claim 1, wherein the bobbin is provided in the outer circumferential surface thereof with line grooves spaced apart from each other, and each of the wires is disposed in a corresponding one of the line grooves.

4. The lens moving apparatus according to claim 3, wherein the line grooves extend to an upper surface or a lower surface of the bobbin.

5. The lens moving apparatus according to claim 3, wherein a depth of each of the line grooves is greater than or equal to a thickness of a corresponding one of the wires.

6. The lens moving apparatus according to claim 1, comprising a printed circuit board connected to at least one of the upper and lower elastic members.

7. The lens moving apparatus according to claim 6, wherein each of the upper and lower elastic members comprises an inner frame coupled to the bobbin, an outer frame coupled to the housing, and a connection portion for connecting the inner frame and the outer frame to each other, and the wires are connected to the inner frame of at least one of the upper and lower elastic members.

8. The lens moving apparatus according to claim 1, wherein the sidewall of the receiving recess has an opening configured to communicate with one of a lower surface and an upper surface of the bobbin.

9. A lens moving apparatus comprising:

a bobbin;

a position sensor disposed on an outer circumferential surface of the bobbin, the position sensor being configured to move together with the bobbin;

a plurality of wires disposed on the outer circumferential surface of the bobbin so as to be connected to the position sensor;

a first coil disposed on the outer circumferential surface of the bobbin, on which the position sensor is disposed;

a first magnet disposed so as to be opposite the first coil;

a housing configured to support the first magnet;

upper and lower elastic members coupled to the bobbin and the housing; and a printed circuit board connected to at least one of the upper and lower elastic members, wherein at least one of the upper and lower elastic members is divided into two or more parts, wherein the wires connect at least one of the upper and lower elastic members to the position sensor, wherein the upper elastic member comprises first to fourth upper elastic members, which are electrically separated from each other, wherein the lower elastic member comprises first and second lower elastic members, which are electrically separated from each other, wherein each of the first to fourth upper elastic members and the first and second lower elastic members comprises an inner frame coupled to the bobbin, an outer frame coupled to the housing, and a connection portion for connecting the inner frame and the outer frame to each other, and wherein each of the wires is connected to the inner frame of a corresponding one of the first and second upper elastic members and the first and second lower elastic members.

10. A lens moving apparatus comprising:

a bobbin having a first coil installed at an outer circumferential surface thereof;

a position sensor provided at the bobbin;

a first magnet provided so as to be opposite the first coil and the position sensor;

a housing configured to support the first magnet; and a conductive pattern formed on the bobbin by plating, the conductive pattern being connected to the position sensor, wherein the bobbin is provided with a location recess in which the position sensor is located, and wherein one end of the conductive pattern connected to the position sensor is formed in the location recess.

11. The lens moving apparatus according to claim 10, wherein the conductive pattern is formed on a surface of the bobbin by laser direct structuring (LDS).

12. The lens moving apparatus according to claim 10, comprising:

upper and lower elastic members coupled to the bobbin and the housing, wherein the other end of the conductive pattern is connected to the upper lower elastic member.

13. The lens moving apparatus according to claim 10, wherein the position sensor is provided at the bobbin so as to be spaced apart from the first coil in a first direction.

14. The lens moving apparatus according to claim 10, wherein the first magnet and the position sensor are provided at opposite surfaces so as to be spaced apart from each other.

15. The lens moving apparatus according to claim 10, wherein the first magnet is configured such that an N pole and an S pole are disposed in a second direction and/or a third direction, which is perpendicular to a first direction.

16. The lens moving apparatus according to claim 10, wherein the first magnet comprises a plurality of first magnets provided in a first direction, and each of the first magnets is configured such that an N pole and an S pole are disposed in a second direction and/or a third direction, which is perpendicular to a first direction.

17. The lens moving apparatus according to claim 10, wherein an adhesive is coated on a surface of the bobbin and an upper surface of the conductive pattern in at least a portion of a region of the bobbin at which the conductive pattern is formed.

* * * * *